US010000865B2

(12) United States Patent
Sutti et al.

(10) Patent No.: US 10,000,865 B2
(45) Date of Patent: Jun. 19, 2018

(54) APPARATUS FOR PRODUCING NANOBODIES VIA SHEAR FLOW FORMATION

(71) Applicant: HEIQ PTY LTD, Waurn Ponds, Victoria (AU)

(72) Inventors: Alessandra Sutti, Torquay (AU); Mark Kirkland, Batesford (AU); Paul Collins, Armstrong Creek (AU); Ross John George, Barrabool (AU)

(73) Assignee: HEIQ PTY LTD, Victoria (AU)

( * ) Notice: Subject to any disclaimer, the term of this patent is extended or adjusted under 35 U.S.C. 154(b) by 154 days.

(21) Appl. No.: 14/771,362

(22) PCT Filed: Mar. 5, 2014

(86) PCT No.: PCT/AU2014/000204
§ 371 (c)(1),
(2) Date: Aug. 28, 2015

(87) PCT Pub. No.: WO2014/134668
PCT Pub. Date: Sep. 12, 2014

(65) Prior Publication Data
US 2016/0010242 A1 Jan. 14, 2016

(30) Foreign Application Priority Data

Mar. 6, 2013 (AU) ................................ 2013900814

(51) Int. Cl.
*D01D 5/40* (2006.01)
*B82Y 40/00* (2011.01)
(52) U.S. Cl.
CPC ................ *D01D 5/40* (2013.01); *B82Y 40/00* (2013.01)
(58) Field of Classification Search
CPC ........ D01D 5/40; B29C 47/128; B29C 47/145
(Continued)

(56) References Cited

U.S. PATENT DOCUMENTS 3,415,920 A * 12/1968 Lee ...................... B29C 47/065
264/173.12
3,485,912 A * 12/1969 Schrenk .............. B29C 47/0016
264/172.15
(Continued)

FOREIGN PATENT DOCUMENTS

WO 2013/056312 A1 4/2013

OTHER PUBLICATIONS

The International Preliminary Report on Patentability with amended sheets for PCT/AU2014/000204 dated Nov. 27, 2014, pp. 1-20.
(Continued)

*Primary Examiner* — Timothy Kennedy
(74) *Attorney, Agent, or Firm* — McDonnell Boehnen Hulbert & Berghoff LLP

(57) ABSTRACT

An apparatus for producing a body, preferably a nano-body, through the introduction of a body-forming fluid into a dispersion medium. The apparatus includes: a fluid housing configured to house a dispersion medium; at least two separated flow paths along which the dispersion medium flows in a laminar flow, at least two of the separated flow paths converging at a flow-merge location; a fluid flow arrangement which, in use, causes the dispersion medium to flow along each flow path to the flow-merge location; at least one fluid introduction arrangement located at or proximate the flow-merge location configured, in use, to feed the body-forming fluid into the dispersion medium; and a flow constriction arrangement proximate to or following the flow-merge location, which in use, constricts and accelerates the dispersion medium flow proximate to and/or following the flow-merge location.

22 Claims, 11 Drawing Sheets

(58) Field of Classification Search
USPC .................................................. 425/462, 463
See application file for complete search history.

(56) References Cited

U.S. PATENT DOCUMENTS

| | | | | |
|---|---|---|---|---|
| 3,606,636 A | * | 9/1971 | Glass | ................ B29C 47/0021 |
| | | | | 425/381 |
| 2010/0013115 A1 | | 1/2010 | Breslauer et al. | |
| 2012/0292810 A1 | | 11/2012 | Peno et al. | |
| 2013/0012598 A1 | | 1/2013 | Velev et al. | |

OTHER PUBLICATIONS

The International Search Report (ISR) for PCT/AU2014/000204 dated Apr. 17, 2014, pp. 1-4.

* cited by examiner

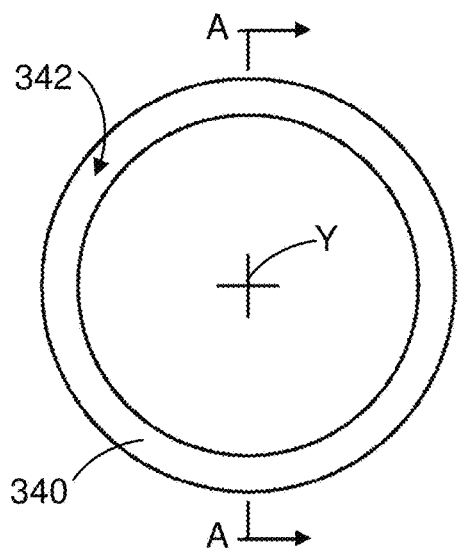
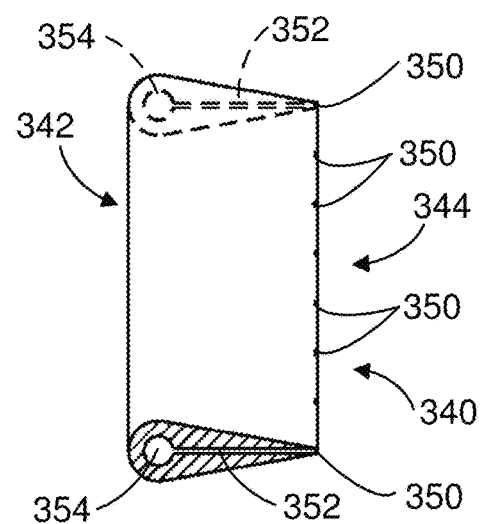
Figure 8A  Figure 8B
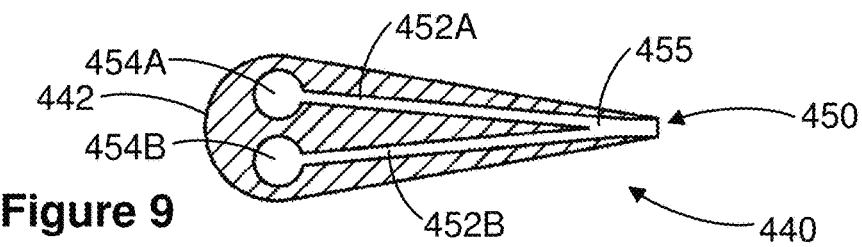
Figure 9
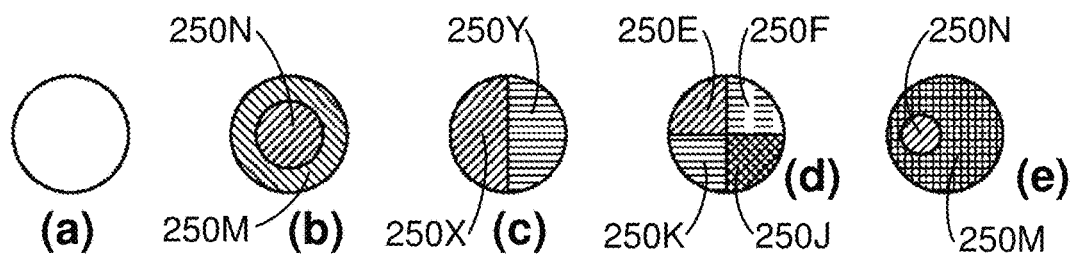
Figure 10

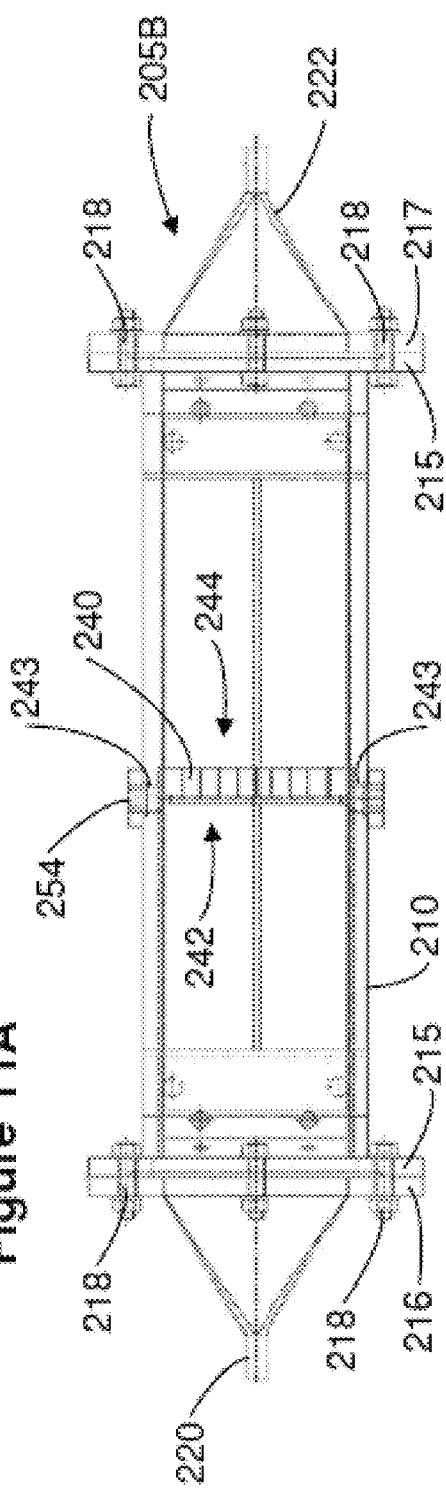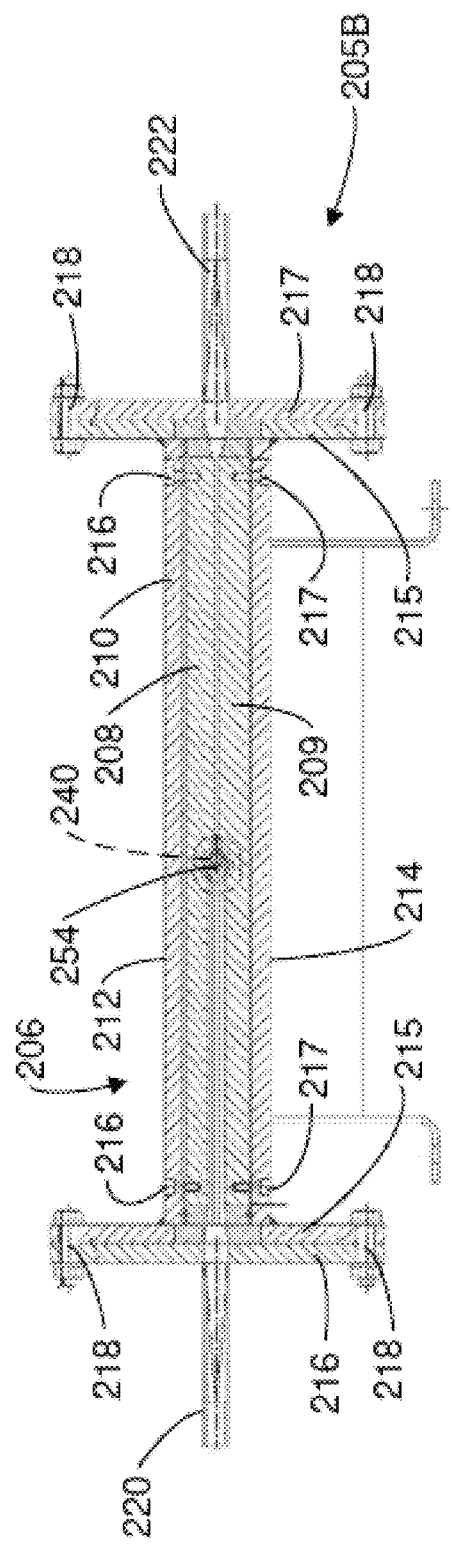

APPARATUS FOR PRODUCING NANOBODIES VIA SHEAR FLOW FORMATION

CROSS-REFERENCE

This application is a U.S. National Phase of International Application No. PCT/AU2014/000204, filed Mar. 5, 2014, which claims priority to Australian Patent Application No. 2013900814, filed Mar. 6, 2013, the disclosures of which are hereby incorporated by reference in their entireties.

TECHNICAL FIELD

The present invention generally relates to an apparatus for producing nano-bodies such as particles or fibres, and in particular short nanofibres. The invention is particularly applicable for producing fibres through the introduction of a body-forming fluid into a dispersion medium in the presence of a selected shear rate within the dispersion medium and it will be convenient to hereinafter disclose the invention in relation to that exemplary application.

BACKGROUND OF THE INVENTION

The following discussion of the background to the invention is intended to facilitate an understanding of the invention. However, it should be appreciated that the discussion is not an acknowledgement or admission that any of the material referred to was published, known or part of the common general knowledge as at the priority date of the application.

Short nanofibres can be created by injecting a body-forming fluid, such as a polymer solution dissolved in water (0.1 to 30% wt/vol of solvent), into a dispersion medium, typically a fluid such as butanol or water, having a viscosity in the range of from about 1 to 100 centiPoise (cP) and moving at 0.1 to 10 m/s. Under these conditions, the polymer solution is drawn out and fractures into short fibres, while the rapid extraction of water from the polymer solution caused by the Butanol causes the polymer to gel. Fibre size can be controlled by varying the shear force and the polymer concentration, from 15 to 2500 nm diameter and 2 to 20 μm length.

One example of this nanofibre generation method is described in international patent application PCT/AU2012/001273, the contents of which are taken to be incorporated into this specification by this reference. This patent application describes a bench scale experimental apparatus for performing the described short nanofibre generation method. The apparatus consists of a rotary mixer having a 5 cm impeller blade immersed in a beaker of the dispersion medium (Butanol). The blade is surrounded by a metal ring which includes and is divided by a series of 16 circumferentially spaced apart slits having an area of 1.5 cm². For fibre generation, the impeller of the mixer is driven to the required rotation (and thus shear rate) of between 4000 and 10000 rpm, providing a maximum velocity of the tip of the blade of around 26 m/s when at 10000 rpm. The selected body-forming fluid is then injected into the dispersion medium in the beaker through a 25 g needle adjacent to one of the ports on the side of the mixer in close proximity to the blade.

The impeller blade configuration and rotation speed of this bench scale experimental apparatus provides a non-laminar (turbulent) system within the solvent. This creates significant mixing within the solvent, and thus poor predictability and control over the reagents within the system. Moreover, the overall system configuration provides poor control over rate of polymer injection, and poor control over the positioning of the needle tip.

Mercader et al. (2010) Kinetics of fibre solidification, PNAS early edition, (www.pnas.org/cgi/doi/10.1073/pnas.1003302107) describes an experimental apparatus for investigating the kinetics of fibre solidification comprising a capillary pipe with a diameter constriction. The diameter constriction of the pipe was used to produce an extensional flow a coflowing stream of an aqueous PVA solution. Nanofibres were produced by injecting an aqueous dispersion of nanotubes into the coflowing PVA stream upstream of the constriction. The injected nanotubes underwent bridging coagulation when contacted with the PVA solution to form a fibre. The fibre was translated and extended by the surrounding fluid at the center of the pipe at a controlled velocity. The constriction was shown to produce a net tensile stress in the fibre in response to viscous drag. The formed fibre was also shown to fragment into shorter length fibres when the surrounding drag forces exceed the tensile strength of the fibre.

While fibres and short fibres are shown to be produced by this method, it is considered that the described apparatus does not provide sufficient control of the reagents and flow conditions for the reproducible production of fibres of small diameter. Moreover, as described, there is anticipated to be some difficulties in alignment of the injection port with the centre of the capillary.

It would therefore be desirable to provide an improved and/or alternative device for the production of drawn bodies such as fibres, preferably short nano-fibres.

SUMMARY OF THE INVENTION

A first aspect of the present invention provides an apparatus for producing a body, preferably a nano-body, through the introduction of a body-forming fluid into a dispersion medium. The apparatus includes:

a fluid housing configured to house a dispersion medium;

at least two separated flow paths along which the dispersion medium flows in a laminar flow, at least two of the separated flow paths converging at a flow-merge location;

a fluid flow arrangement which, in use, causes the dispersion medium to flow along each flow path to the flow-merge location;

at least one fluid introduction arrangement located at or proximate the flow-merge location configured, in use, to feed the body-forming fluid into the dispersion medium; and a flow constriction arrangement proximate to or following the flow-merge location, which in use, constricts and accelerates the dispersion medium flow proximate to and/or following the flow-merge location.

The laminar flow and the constriction arrangement of the apparatus of the present invention form a controlled flow area in the dispersion medium at and/or following the flow-merge location. The laminar fluid flow environment provides a smooth transition between the flow of the dispersion medium and the flow of the injected body-forming fluid. The body-forming fluid is therefore fed into the surrounding controlled flow area and constricted at and proximate to the flow-merge location. This enables improved control over rate of polymer injection as compared to the previous impeller and ring based system. Furthermore, the use of a dedicated fluid introduction arrangement located at or proximate to the flow-merge location improves the positioning of the injection points as compared to the previous impeller and ring based system.

The combination of laminar flow and the constriction arrangement create a controllable extensional flow which draws and forms the described body configuration following the flow-merge location of the apparatus. Where an elongate body, such as a filament, is formed from the introduced body-forming fluid, the acceleration may also cause that elongate body to break, through the creation of the required tensile stress and/or shear rates to allow fragmentation of the elongate body formed by the body-forming fluid in the dispersion medium.

It should be appreciated that the apparatus can be used to produce a variety of bodies, preferably nano-bodies, of different configurations, shapes and sizes. Examples include rods, ribbons, droplets, particles, filaments, fibres, short fibres, nanofibres, short nanofibres or the like. In preferred embodiments, the apparatus of the present invention produces fibres, preferably nanofibres. The bodies prepared may include a different material core, such as a liquid, gel, solid, gas or similar.

The flow constriction arrangement can include any suitable component or components which constrict and accelerate the flow of the dispersion medium. The flow constriction can comprise any suitable arrangement, including one or more baffles, weirs, flow constricting apertures, dimension changes such as fluid flow area changes or the like.

In some embodiments (and as described below), one or more hydrofoils can be used to accelerate and constrict a flow of the dispersion medium flowing over the hydrofoil.

In some embodiments, the flow constriction arrangement can include a change in a dimension of the fluid housing. The dimension change preferably comprises a change in the fluid flow cross-sectional area of the fluid housing, and more preferably a reduction in the overall fluid flow cross-sectional area from the flow upstream of the flow-merge location compared to the flow downstream of the flow-merge location. For example, in those embodiments in which the fluid housing comprises a conduit, the flow constriction preferably includes a reduction in the cross-sectional area within the conduit. The fluid housing may therefore include at least first flow section having a first fluid flow cross-sectional area and at least second flow section having a second fluid flow cross-sectional area, the first fluid flow cross-sectional area being greater than the second fluid flow cross-sectional area.

The flow constriction of the second flow section creates an acceleration zone, where the dispersion medium is accelerated along the axis of the fluid housing of the second flow section at the entrance of the constriction. This acceleration induces the development of an extensional flow field. While not wishing to be limited to any one theory, it is thought that the body formed from the injected body-forming fluid transported by the dispersion medium is stretched in response to the acceleration of the dispersion medium. The acceleration results in a tensile stress in and/or shear stress applied to that formed body, which can fragment or break the body if the maximum stress exceeds the tensile strength of the body.

The second flow section can commence proximate to or at a distance, preferably a short distance following (downstream of) the flow-merge location. In some embodiments, the flow-merge location is spaced away upstream of the start of the second flow section. Spacing the trailing edge and therefore fluid introduction arrangements apart from the second flow section creates a separate fluid introduction zone and acceleration zone (as described above).

The flow constriction preferably comprises a reduction in fluid flow cross-sectional area between the first flow section and second flow section of at least 50%, more preferably at least 60%, yet more preferably at least 70%, and most preferably at least 75%. In those embodiments that include plates, the gap between plates preferably reduces from between 8 and 15 mm to between 1 and 5 mm, more preferably from between 18 and 11 mm to between 1 and 3 mm, and yet more preferably from 9 mm to 2 mm.

The flow constriction may comprise an immediate dimension change in the fluid housing, for example a conduit. However, it is preferred that the change is more gradual, having a progressive dimension change. The progression may comprise a ramp or smooth transition, stepped or a combination thereof. For example, in some embodiments a third flow section can be provided located between the first flow section and the second flow section of the fluid housing, the third flow section having a transitory cross-sectional area, preferably tapering cross-sectional area, interconnecting the first and second flow sections. The cross-sectional area of the third flow section preferably comprises a between 5 and 30°, and preferably about 10° taper between the first flow section and the second flow section.

The flow constriction may comprise one or a series of dimension changes in the fluid housing. In some embodiments, the flow constriction includes two or more dimension changes in the fluid housing. For example, the flow constriction may include a first reduction in cross-sectional area, followed by a second reduction in cross-sectional area, and in some embodiments followed by a third or more reduction in cross-sectional area. The series of dimension changes in the fluid housing may progressively change the dimension of the fluid housing (for example the cross-sectional area) from an initial dimension to a final dimension, or may comprise a series of expansion and contraction points in which the dimension of the fluid housing varies between an expanded dimension and a contracted dimension. For example, the flow constriction may comprise series of reductions and expansions in cross-sectional area between a first cross-sectional area and a second (reduced or constricted) cross-sectional area.

The fluid flow entering the first flow section of the conduit or conduits can have any suitable flow characteristic, including laminar, turbulent or the like, as long as the flow becomes laminar in the first flow section prior to the flow-merge location. Laminar flow can be achieved using one or more flow aids which modify the flow characteristics of the dispersion medium flow prior to the flow-merge location. In some embodiments, the arrangement further includes at least one baffle located in the fluid housing which, in use, contacts the dispersion medium flow before the flow-merge location. In other embodiments, a flow distributor, such as one or more hydrofoils, can be used to induce laminar flow into the dispersion medium flow through the first flow section. Embodiments including hydrofoils are described in more detail below. In preferred embodiments, the fluid flow arrangement forms a laminar flow in the first flow section. In this respect, a laminar fluid flow can be more easily controlled and the results predicted.

In those embodiments where the fluid housing includes one or more conduits through which the dispersion medium flows, the conduit(s) can take a number of configurations. In some embodiments, the conduit(s) comprises a tubular pipe, preferably a pipe having at least one of a circular, square, rectangular or other regular polygon cross-sectional shape.

In some embodiments, the conduit or conduits include at least two spaced apart plates. The plates are fluidly sealed within the conduit or conduits. The fluid seal may comprise any number of arrangements. In some embodiments, the plates can be housed within a fluid tight casing, preferably fluidly sealed within a fluid tight conduit, for example a tubular conduit. In this embodiment, the plates can be secured or otherwise fastened to adjoining or adjacent surfaces of the fluid tight conduit. In some embodiments, the plates are sealed around the periphery of each plate, and more preferably around the edges of the plates.

It can be advantageous to be able to vary the dimensions of the fluid housing and in particular, the dimensions of those parts of the fluid housing through which the dispersion medium flows (in the relevant embodiments). For example, where conduit(s) includes at least two spaced apart plates, it can be advantageous to be able to vary the distance between the plates. This adjustment can therefore vary the flow area and therefore the flow velocity of the dispersion medium flowing between the two plates and to and over the hydrofoil.

The flow constriction arrangement can create shear stress in the dispersion medium creating conditions allowing fragmentation of any body, particularly elongate bodies such as filaments in the dispersion medium. The flow constriction arrangement preferably creates a shear in the dispersion medium at the trailing edge of the hydrofoil where the fluid has a linear speed of at least 0.1 m/s, preferably between 0.2 to 20 m/s, more preferably between 0.5 and 10 m/s, yet more preferably between 1 to 10 m/s. In some embodiments, the flow constriction arrangement can create a shear stress in the range of from about 100 to about 190,000 cP/sec.

The fluid introduction arrangement of the present invention is used to introduce the body-forming fluid into the dispersion medium at or proximate the flow-merge location of the apparatus. The body-forming fluid may be introduced to the dispersion medium using a suitable technique. In some embodiments, the body-forming fluid is injected into the dispersion medium. The body-forming fluid may be injected into the dispersion medium at a rate in a range selected from about 0.0001 L/hr to about 10 L/hr, or preferably from about 0.1 L/hr to 10 L/hr.

When the body-forming fluid is a body-forming solution, such as a polymer solution, the body-forming solution may be injected into the dispersion medium at a rate in a range selected from the group consisting of from about 0.0001 L/hr to 10 L/hr, from about 0.001 L/hr to 10 L/hr, or from about 0.1 L/hr to 10 L/hr.

A person skilled in the relevant art would understand that the rate at which a body-forming fluid is introduced to the dispersion medium may be varied according to the scale on which the process of the invention is carried out, the volume of body-forming fluid employed, and the desired time for introducing a selected volume of body-forming fluid to the dispersion medium. In some embodiments it may be desirable to introduce the body-forming fluid into the dispersion medium at a faster rate this may assist in the formation of fibres with smoother surface morphologies. The injection speed may be regulated by means of a pump, such as for example a syringe pump or a peristaltic pump.

The fluid introduction arrangement can be a separate element inserted into the flow-merge location, for example a needle or other conduit, or integrated into a body or component located at the flow-merge location. When formed in a body or component located at the flow-merge location, the fluid introduction arrangement includes at least one aperture, preferably located at or on said body or component. The aperture is preferably fluidly linked to a conduit or channel formed or housed within said body or component through which the body-forming fluid is fed.

In some embodiments, one or more of the apertures can be fluidly connected to at least two different body-forming fluids. This enables a fibre to be formed including two different materials. The body-forming fluid may be combined in various ways. In some embodiments, the two or more body-forming fluids may be intermixed prior to being introduced into the dispersion medium. In other embodiments, the two or more body-forming fluids may be intermixed proximate or at the point the body-forming fluids are introduced into the dispersion medium. For example, one or more of the apertures may be fluidly connected to at least two conduits or channels through which at least one body-forming fluid flows, each conduit or channel joining at a merge section located proximate to the at least one aperture. The merge section preferably includes a short conduit or channel fluidly connected to the at least one aperture. In some embodiments, the merge section comprises a Y or T junction.

In some embodiments, the fluid introduction arrangement includes at least two proximate apertures, each aperture being fluidly connected to at least one body-forming fluid. This enables the respective body-forming fluids to overlap, intertwine or at least interact in some way when introduced into the dispersion medium. Subsequent fibre formation may therefore create an intertwined, mixed or otherwise interconnected fibre configuration. In some embodiments, at least two of the apertures are fluidly connected to different body-forming fluids. This enables fibre configurations to be formed with two different materials having an intertwined, mixed or otherwise interconnected fibre configuration.

In some embodiments, at least two of the apertures overlap. In such embodiments, at least two of the apertures can be arranged with a first aperture enclosed within a second aperture. In some forms, three or more of the apertures can be configured in an overlapping configuration. In some forms, the two apertures may be concentrically arranged. For example, one aperture (the inner aperture) may be fully or partially enclosed by another aperture (the outer aperture). This can produce a fibre within fibre configuration, where a first fibre is encapsulated or otherwise formed within another fibre. A first material can be encapsulated within a second material in those embodiments in which the at least two of the at least two apertures are fluidly connected to different body-forming fluids.

The apertures of the fluid introduction arrangements can have a number of different shapes and configurations. In some embodiments, the fluid introduction arrangements have a circular shape. However, it should be appreciated that any number of shapes could be possible including star shaped, cross shaped, oval shaped, any number of regular polygons such as triangular, square, rectangular, pentagonal, octagonal or the like.

Laminar flow in the at least two separated flow paths can be created in any suitable manner. In some embodiments, the separate flow paths of at least two of the separated flow paths comprise separate flow conduits. In this embodiment, laminar flow can be created in those separate conduits through control of the flow characteristics in each of those conduits. For example, the fluid flow arrangement could be controlled to provide the required flow velocity for laminar flow in the separate conduits. Furthermore, the configuration of the conduits could be optimised for laminar flow. In such embodiments, the flow constriction arrangement would comprise a reduction of the outflow cross-sectional area as compared to the combined inflow cross-sectional area of the at least two separate flow conduits proximate to or following the flow-merge location.

In other embodiments, the at least two separated flow paths can be separated by at least one hydrofoil located in the fluid housing, the hydrofoil having a leading face and a trailing edge, the fluid flow arrangement causing the dispersion medium to flow in a laminar flow from the leading face to the trailing edge thereof.

A second aspect of the present invention provides an apparatus for producing fibres by introducing a fibre forming liquid into a dispersion medium, the apparatus including:

a fluid housing configured to house a dispersion medium;

at least one hydrofoil located in the fluid housing, the hydrofoil having a leading face and a trailing edge;

at least one fluid introduction arrangement located at or proximate the trailing edge of at least one of the hydrofoils configured, in use, to feed the fibre forming liquid into the dispersion medium housed in the fluid housing; and a fluid flow arrangement which, in use, causes the dispersion medium to flow across the hydrofoil from the leading face to the trailing edge thereof.

The hydrofoil of the apparatus of the present invention creates a controlled flow area in the dispersion medium at and/or following the trailing edge of the hydrofoil. The hydrofoil is designed to accelerate and constrict the flow of dispersion medium flowing over the hydrofoil in order to form an extensional flow which draws and forms a fibrous polymer filament at the trailing edge of the hydrofoil. The acceleration may also cause the filament to break, through the creation of the required tensile stress and/or shear rates to allow fragmentation of a filament formed by the body-forming fluid in the dispersion medium, to form short fibres.

The hydrofoil also creates a laminar fluid flow environment over the flow surfaces and at and/or proximate its trailing edge. This provides a smooth transition between flow of the dispersion medium and the flow of the injected body-forming fluid. The body-forming fluid is therefore fed into the surrounding controlled flow area and constricted at and/or proximate the hydrofoil, enabling improved control over rate of polymer injection as compared to the previous impeller and ring based system. Furthermore, the use of a dedicated fluid introduction arrangement located at or proximate the trailing edge of at least one of the hydrofoils, and preferably incorporated into the hydrofoil, improves the positioning of the injection points as compared to the previous impeller and ring based system.

The hydrofoil can have various shapes and configurations. In some embodiments, the leading face of the hydrofoil preferably comprises a rounded or curved surface. Furthermore, the trailing edge of the hydrofoil preferably comprises a substantially flat edge. However, it should be appreciated that other configurations such as rounded, curved, wavy or the like could be used in other embodiments. Additionally, in some embodiments the hydrofoil is substantially symmetrical about the chord line between the leading face and trailing edge of the hydrofoil. As is understood in the art, the chord line of a hydrofoil is a straight line connecting the leading and trailing edges of the hydrofoil. However, again it should be appreciated that other configurations the hydrofoil may a different shapes or configurations about the chord line in other embodiments.

The hydrofoil and leading face and trailing edge can follow any suitable geometry. In some embodiments, the hydrofoil has a linear geometry. In other embodiments, the hydrofoil has a cylindrical or elliptical geometry, with the leading face and trailing edge having an annular configuration, being centred about a hydrofoil center point. Such a hydrofoil would preferably have a toroidal shape, preferably tapered at the trailing edge. The dispersion medium would preferably flow through the inner void and outer surfaces of the hydrofoil.

The hydrofoil preferably includes a tapered body which tapers in thickness between the leading face and the trailing edge. In some embodiments, the tapered body of the hydrofoil comprises between 5 and 30°, preferably about 10° taper between the leading face and trailing edges thereof relative to a center line, preferably the chord line, therebetween.

Advantageously, the above preferred configuration creates laminar flow at or proximate to the trailing edge of the hydrofoil.

In order to create a desired flow pattern across the hydrofoil, the tapered body of the hydrofoil may include at least one curve or wave along the longitudinal length of the body of the hydrofoil, and more preferably a plurality of curves or waves along said longitudinal length.

The fluid introduction arrangement can be a separate element to the hydrofoil, for example a needle or other conduit inserted at or near the trailing edge the hydrofoil. However, it is preferred that the fluid introduction arrangement is formed in the hydrofoil.

When formed in the hydrofoil, the fluid introduction arrangement includes at least one aperture, preferably located at or on the hydrofoil, at or proximate the trailing edge of the hydrofoil. The aperture is preferably fluidly linked to a conduit or channel formed or housed within the hydrofoil through which the body-forming fluid is fed.

In some embodiments, the apparatus includes two or more hydrofoils. Such multi-hydrofoil systems may have the hydrofoils aligned side by side, stacked, placed in parallel, in series or the like.

The hydrofoil can include any number of fluid introduction arrangements. Multiple fluid introduction arrangements are preferably used in those embodiments that include a longitudinally elongate or otherwise suitably dimensioned hydrofoil. Where the hydrofoil comprises a plurality of fluid introduction arrangements, it is preferred that those fluid introduction arrangements are spaced apart along the longitudinal length of each hydrofoil. Similarly, the apparatus may include a plurality of hydrofoils spaced apart within the fluid housing. Each hydrofoil would include at least one fluid introduction element located at or proximate the trailing edge of at least one of each respective hydrofoil.

The hydrofoil preferably includes a central feed conduit fluidly connected to each of the fluid introduction arrangements in those embodiments in which the hydrofoil includes a plurality of fluid introduction arrangements. The central feed conduit can be used to feed body-forming fluid to each of the individual fluid introduction arrangements from a single source. The central feed conduit is preferably formed within the body of the hydrofoil. In some embodiments, the central feed conduit extends along the longitudinal length of the, or each, hydrofoil. In some embodiments, the central feed conduit is centred on the cord line of the hydrofoil. Though, it should be appreciated that the central feed conduit could be positioned at any suitable location within or outside of the hydrofoil.

In some embodiments, the flow constriction arrangement includes both a hydrofoil and a change in the cross-sectional area of the fluid housing in order to constrict and accelerate the flow of the dispersive medium in the fluid housing. Again, in those embodiments in which the fluid housing comprises a conduit, the flow constriction preferable comprises a change in the cross-sectional area within the conduit. In such embodiments, the conduit preferably includes at least first flow section having a first cross-sectional area and at least second flow section having a second cross-sectional area, the first cross-sectional area being greater than the second cross-sectional area.

The second flow section can commence proximate to or a distance, preferably a short distance following (downstream of) the trailing edge of the hydrofoil. In some embodiments, the trailing edge of the hydrofoil is spaced away upstream of the start of the second flow section. Spacing the trailing edge and therefore fluid introduction arrangements apart from the second flow section creates a separate fluid introduction zone and acceleration zone (as described above).

The hydrofoil is preferably located in a third flow section positioned between the first and second flow sections of the conduit. The third flow section has a transitory cross-sectional area, preferably tapering cross-sectional area, interconnecting the first and second flow sections. The taper of the third flow section preferably substantially matches the taper between the leading face and trailing edge of the hydrofoil.

Any suitable fluid housing can be used, depending on the configuration of the apparatus. In some embodiments, the fluid housing can include at least one conduit through which the dispersion medium flows. In other embodiments, the fluid housing can include a reservoir in which the dispersion medium is held. One or more combination of these configurations also possible. In each embodiment, the dispersion medium is preferably recycled through the fluid housing.

The fluid flow arrangement can take various forms depending on the overall configuration of the apparatus.

In some embodiments, the fluid flow arrangement comprises a pumping arrangement for pumping the dispersion medium along the separated flow paths. The dispersion medium can therefore be pumped at a desired flow rate to create laminar flow and to create the desired flow acceleration of the dispersion medium and entrained formed body within the flow constriction arrangement. In this embodiment, the fluid housing preferably comprises a conduit through which the dispersion medium flows.

In other embodiments, the fluid flow arrangement comprises a rotatable element, driven or otherwise moved to rotate the hydrofoil within the fluid housing. In this embodiment, the fluid housing preferably comprises a suitable reservoir in which the dispersion medium is held. The reservoir can be held in a receptacle, container, vessel or other bulk liquid retaining body. Suitable examples include a mixing vessel, such as a beaker, bucket, drum, or larger process vessel. The rotatable element preferably comprises a drive element, such as a motor, connected to a shaft or other driven element. The at least one hydrofoil is therefore preferably connected to the shaft, preferably at or near the base of the shaft. The fluid flow arrangement preferably comprises a rotor or stirrer element of a mixer. In those embodiments which include hydrofoils, the hydrofoil preferably comprises part of a driven impeller of the rotor or stirrer element. In these embodiments, the hydrofoil is rotatably driven in the dispersion medium, to create the necessary shear force within that fluid.

In yet other embodiments, a combination of the above two embodiments may also be possible, where the fluid flow arrangement comprises a pumping arrangement for pumping the dispersion medium in the separate flow paths and a rotatable element, driven or otherwise moved to rotate the a component of the apparatus, for example a hydrofoil, within the fluid housing.

The fluid housing may include one or more flow aids which modify the flow characteristics of the dispersion medium flow prior to the flow-merge location. In some embodiments, the arrangement further includes at least one baffle located in a location in the housing which, in use, contacts the dispersion medium flow before the flow-merge location. In those embodiments in which the fluid housing comprises a conduit, the baffles are preferably located in the conduit upstream of the flow-merge location.

A large number of body-forming fluids and dispersion mediums can be used in the apparatus of the present invention. Suitable examples are described in detail in International application No. PCT/AU2012/001273 published as WO 2013056312 A1, the contents of which are incorporated into this specification by this reference.

The body-forming fluid is preferably a flowable viscous liquid and includes at least one body-forming substance. In exemplary embodiments, the dispersion medium employed in the process of the invention is a liquid that is generally of lower viscosity than the body-forming fluid. The relationship between the viscosity of the body-forming fluid ($\mu 1$) to the viscosity of the dispersion medium ($\mu 2$) may be expressed as a viscosity ratio (p), where $p=\mu 1/\mu 2$. In one form of the invention, the viscosity ratio is in the range of from about 2 to 100. In some embodiments, the viscosity ratio is in the range of from about 2 to 50.

In some embodiments, the dispersion medium preferably has a viscosity in the range of from about 1 to 100 centiPoise (cP). In embodiments of the process, the dispersion medium has a viscosity in the range of from about 1 to 50 centiPoise (cP). In some embodiments, the dispersion medium has a viscosity in the range of from about 1 to 30 centiPoise (cP), or from about 1 to 15 centiPoise (cP). In some embodiments, the body-forming fluid has a viscosity in the range of from about 3 to 100 centiPoise (cP). In some embodiments, the body-forming fluid has a viscosity in the range of from about 3 to 60 centiPoise (cP).

In preferred embodiments, the body-forming fluid comprises a polymer solution, and the dispersion medium comprises a liquid in which the polymer is insoluble.

In one set of embodiments the body-forming fluid is in the form of a body-forming solution including at least one body-forming substance in a suitable solvent. The body-forming substance may be a polymer or a polymer precursor, which may be dissolved in the solvent. In some embodiments the body-forming solution includes at least one polymer.

The term “polymer” as used herein refers to a naturally occurring or synthetic compound composed of covalently linked monomer units. A polymer will generally contain 10 or more monomer units.

The term “polymer precursor” as used herein refers to a naturally occurring or synthetic compound that is capable of undergoing further reaction to form a polymer. Polymer precursors may include prepolymers, macromonomers and monomers, which can react under selected conditions to form a polymer.

In one set of embodiments that body-forming solution may be a polymer solution including at least one polymer dissolved or dispersed in a solvent. The polymer solution can be used to form polymer fibres.

The apparatus of the invention may be used to prepare polymer fibres from a range of polymer materials. Suitable polymer materials include natural polymers or derivatives thereof, such as polypeptides, polysaccharides, glycoproteins and combinations thereof, or synthetic polymers, and co-polymers of synthetic and natural polymers.

In some embodiments, the apparatus of the invention is used to prepare fibres from water-soluble or water-dispersible polymers. In such embodiments, the body-forming fluid may include a water-soluble or water-dispersible polymer. The body-forming fluid may be a polymer solution including a water-soluble or water-dispersible polymer may be dissolved in an aqueous solvent. In some embodiments, the water-soluble or water-dispersible polymer may be a natural polymer, or a derivative thereof.

In some embodiments the apparatus of the invention is used to prepare fibres from organic solvent soluble polymers. In such embodiments, the body-forming fluid may include an organic solvent soluble polymer. The body-forming fluid may be a polymer solution including an organic solvent soluble polymer dissolved in an organic solvent.

In exemplary embodiments of the apparatus of the invention, the body-forming fluid may include at least one polymer selected from the group consisting of polypeptides, alginates, chitosan, starch, collagen, silk fibroin, polyurethanes, polyacrylic acid, polyacrylates, polyacrylamides, polyesters, polyolefins, boronic acid functionalised polymers, polyvinylalcohol, polyallylamine, polyethyleneimine, poly(vinyl pyrrolidone), poly(lactic acid), polyether sulfone and inorganic polymers and copolymers thereof.

In embodiments, the body-forming substance may be a polymer precursor. In such embodiments the body-forming fluid may include at least polymer precursor selected from the group consisting of polyurethane prepolymers, and organic/inorganic sol-gel precursors.

The dispersion medium used in the apparatus of the invention includes at least one suitable liquid. In some embodiments, the dispersion medium includes at least one liquid selected from the group consisting of an alcohol, an ionic liquid, a ketone solvent, water, a cryogenic liquid, and dimethyl sulfoxide. In exemplary embodiments, the dispersion medium includes a liquid selected from the group consisting of $C_2$ to $C_4$ alcohols. The dispersion medium may include additives or other properties that cause the body-forming substance present in the body-forming fluid to be insoluble, or to otherwise precipitate or gelate, when exposed to the dispersion fluid.

The dispersion medium may include a mixture of two or more liquids, such as a mixture of water and an aqueous soluble solvent, a mixture of two or more organic solvents, or a mixture of an organic and an aqueous soluble solvent. It may also include additives to the dispersion medium that chemically interact with the body-forming liquid so as to induce precipitation or gelation of the dissolved polymer including, but not limited to, acids or bases, ionic molecules and fixation agents.

The body-forming fluid employed in the apparatus of the invention may include an amount of body-forming substance in the range of from about 0.1 to 50% (w/v). In one set of embodiments the body-forming fluid is a polymer solution including an amount of polymer in the range of from about 0.1 to 50% (w/v). In embodiments where the body-forming fluid includes a polymer (such as in a polymer solution or dispersion), the polymer may have a molecular weight in the range of from about $1\times10^4$ to $1\times10^7$. Polymer concentration and molecular weight may be adjusted to provide a body-forming fluid of the desired viscosity.

In some embodiments, the body-forming fluid and/or the dispersion medium may further include at least one additive. The additive may be at least one selected from the group consisting of particles, crosslinking agents, plasticisers, multifunctional linkers and coagulating agents.

In exemplary embodiments, the apparatus is used to produce filaments and fibres, preferably nano-fibres, and more preferably short fibres, and yet more preferably short nano-fibres. The fibres produced by the present the invention are preferably produced as discontinuous fibres, rather than continuous fibres. Further, the fibres prepared by the process of the invention are preferably colloidal (short) fibres. In some embodiments, fibres prepared by the process have a diameter in the range of from about 15 nm to about 5 µm. In one set of embodiments that fibres may have a diameter in the range of from about 40 nm to about 5 µm. In preferred embodiments, the fibres have a diameter of between 50 to 500 nm. Furthermore, the fibres have a length of at least about 1 µm, preferably from about 1 µm to about 3 mm, more preferably between 2 to 20 µm.

The bodies, such as fibres, produced using the apparatus of the present invention can form part of an article. The bodies may be included on a surface of the article. The article may be medical device or a biomaterial, or an article for filtration or printing applications.

BRIEF DESCRIPTION OF THE DRAWINGS

The present invention will now be described with reference to the figures of the accompanying drawings, which illustrate particular preferred embodiments of the present invention, wherein:

FIG. 8 provides a perspective view of another form of the hydrofoil used in the flow device shown in FIG. 3, in which (A) is a front view; and (B) is a cross-sectional view along line A-A of FIG. 8A.

FIG. 9 provides a cross-sectional view of a dual body injection hydrofoil used in the flow device illustrated in FIG. 3.

FIG. 10 illustrates various fluid introduction arrangement aperture configurations which can be used in the hydrofoil used in the flow device illustrated in FIG. 3.

FIG. 11 provides a (A) plan view; and (B) front sectional view of another form of the second embodiment of a fibre generation device of FIG. 3.

DETAILED DESCRIPTION

FIGS. 1 to 12 illustrate different embodiments of a fibre producing apparatus 200, 500 according to the present invention. Each embodiment of the apparatus 200, 500 of the present invention can be used to produce bodies, such as fibres, using a process described in detail in International application No. PCT/AU2012/001273, again, the contents of which are incorporated into this specification by this reference.

As taught in International publication No. WO 2013056312 A1 the process includes the general steps of:

introducing a stream of body-forming fluid into a dispersion medium having a viscosity in the range of from about 1 to 100 centiPoise (cP);

forming a body such as a filament from the stream of body-forming fluid in the dispersion medium;

and where conditions (developed shear stress) are appropriate shearing the body under conditions allowing fragmentation of the filament.

The apparatus of the present invention is configured to optimise conditions of the steps of introducing the body-forming fluid into a laminar flow of dispersion medium and accelerate the dispersion medium and body-forming fluid therein in order to draw and form a desired body. This acceleration may also cause the formed body (for example a filament) to break, through the creation of the required tensile stress in the body and/or shear rates in the dispersion medium.

Figure 1:
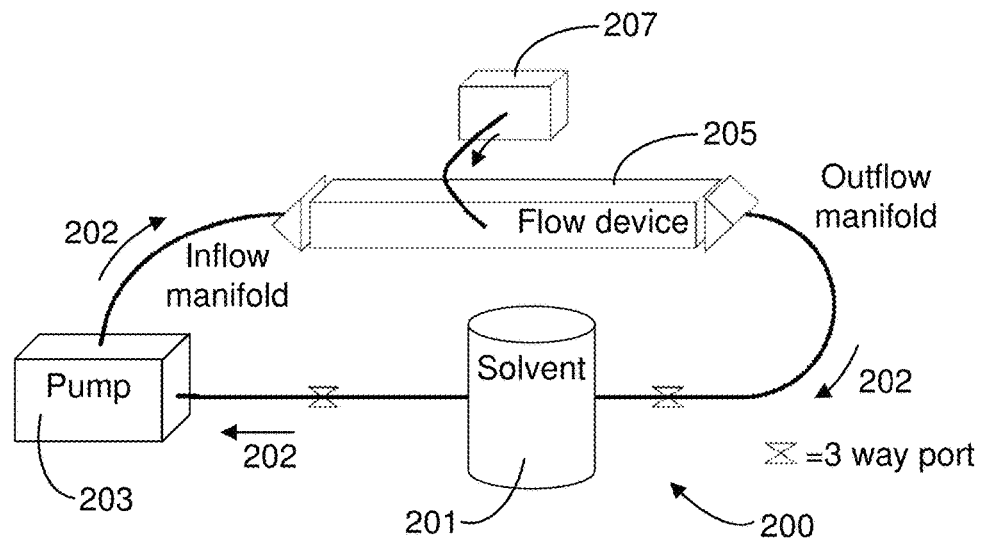
FIG. 1 provides a perspective schematic view of a first embodiment of a fibre generation device according to the present invention.

Referring firstly FIG. 1, there is shown a general overview of a first embodiment of a fibre forming apparatus 200 according to the present invention. The illustrated apparatus 200 comprises a flow circuit 202, through which a dispersion medium, such as a solvent, circulates. The flow circuit 202 includes three fluidly connected units 201, 203 and 205. Firstly, a solvent reservoir or tank 201 in which a volume of the selected dispersion medium is collected, prior to feeding through the flow circuit. The inlet to a pump arrangement 203 is fluidly connected to the solvent tank 201. The pump arrangement 203 pumps the dispersion medium into a fluidly connected flow device 205. The pump arrangement 203 can comprise any suitable pump, including but not limited to positive displacement pump rotary positive displacement pumps, reciprocating positive displacement pumps, gear pumps, screw pumps, progressing cavity pumps, roots-type pumps, peristaltic pumps, plunger pumps, triplex-style plunger pumps, diaphragm pumps, rope pumps, impeller pumps, impulse pumps, hydraulic ram pumps, velocity pumps, centrifugal pumps, radial-flow pumps, axial-flow pumps, mixed-flow pumps, eductor-jet pumps, gravity pumps or a combination thereof. Fibres are formed in the flow device 205 as explained in detail below. The dispersion medium, with nanofibres therein, flows through to the solvent tank 201 where the dispersion medium can be recirculated through the flow circuit 202. The generated fibres can be extracted prior to or from the solvent tank 201 using any number of standard solid-liquid separation techniques, such as filtration, centrifugal extraction, flotation or the like.

The second fibre forming apparatus 200 also includes a body-forming fluid pump 207, which injects the selected body-forming fluid into the flow device 205 as will be described in more detail below. Again, the body-forming fluid pump 207 can comprise any suitable pump, including but not limited to positive displacement pump rotary positive displacement pumps, reciprocating positive displacement pumps, gear pumps, screw pumps, progressing cavity pumps, roots-type pumps, peristaltic pumps, plunger pumps, triplex-style plunger pumps, diaphragm pumps, rope pumps, impeller pumps, impulse pumps, hydraulic ram pumps, velocity pumps, centrifugal pumps, radial-flow pumps, axial-flow pumps, mixed-flow pumps, eductor-jet pumps, gravity pumps or a combination thereof. In some embodiments, the body-forming fluid pump 207 comprises a syringe pump or a peristaltic pump.

Figure 2:
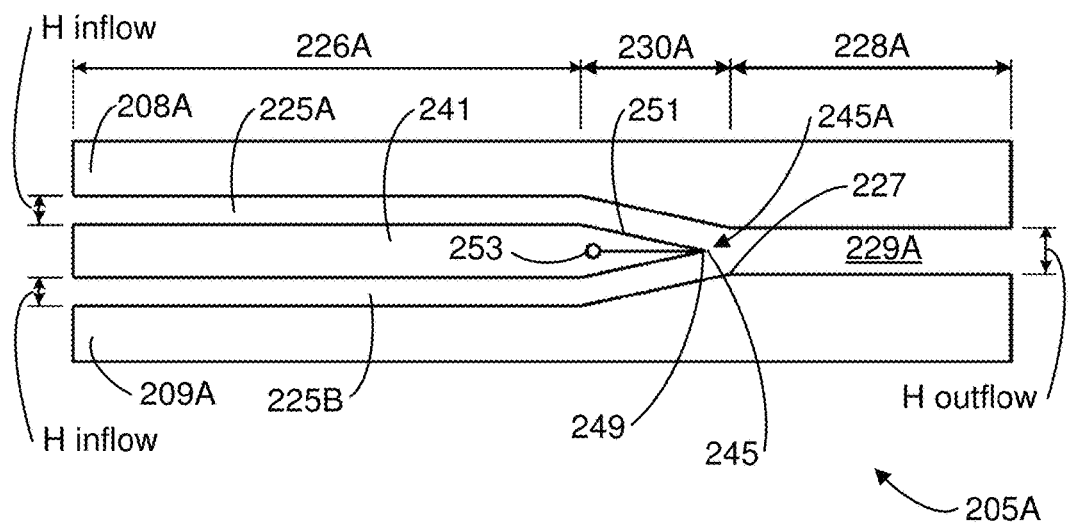
FIG. 2 provides a cross-sectional schematic view of a first embodiment of the flow device for use in the fibre generation device shown in FIG. 1.

As mentioned above, fibre generation occurs in the flow device 205. The flow device 205 can have a number of configurations, two of which are illustrated in FIG. 2. Each configuration uses different methods to develop laminar flow at the flow-merge location.

FIG. 2 illustrates a first embodiment of the flow device 205A in which two separate flow conduits 225 converge at merge location 245, and then flow into a flow constriction 227. The flow device 205A therefore has three distinct sections:

a first flow section 226A, comprising an inflow section comprising the two separated flow conduits 225A and 225B each having a conduit height $h_{inflow}$;

a second flow section 228A, comprising an outflow conduit 229A having a conduit height $h_{outflow}$; and a third flow section 230A located between the first 226A and second flow section 228A of having a transitory cross-sectional area which tapers (in the illustrated embodiment at about 10°, although it should be appreciated that the exact angle can vary) between the first 226A and second flow section 228A.

As shown in the figures, the combined flow area provided by the combined conduit height $2 \times h_{inflow}$ of the separate conduits 225A and 225B of the first section 226A is greater than the conduit height $h_{outflow}$ of the outlet conduit 229A of the second flow section 228A. The cross-sectional area of the first flow section 226A is therefore greater than the cross-sectional area of the second flow section 228A. This dimension change forms a flow constriction, starting at the constriction entrance 227 in the third flow section 230A. The flow constriction preferably comprises a reduction in cross-sectional area between the first flow section 226A and second flow section 228A of at least 50%, more preferably at least 60%, yet more preferably at least 70%, and most preferably at least 75%. However, it should be appreciated that the exact dimensions would depend on the size and configuration of the flow device 205A and apparatus 200.

The fluid flow in the separate conduits 225A and 225B is controlled to provide laminar flow through the conduits 225A and 225B and to the merge location 245. The combined flow then flows through outlet conduit 229A. As can be readily understood, laminar flow can be produced through optimisation and control of various flow parameters, including flow velocity, conduit configuration, fluid properties and the like.

The flow-merge location 245 includes one or more fluid introduction apertures 249 located at or proximate the merge edge 245A configured to feed the body-forming fluid into the dispersion medium. As noted above, the flow in the separate conduits 225A and 225B is controlled to provide laminar flow through the conduits 225A and 225B and to the merge location 245. The location of the fluid introduction apertures 249 at the merge edge 245A therefore provides a smooth transition between outer dispersion medium flow and the injected flow of the body-forming fluid. Each of the apertures 249 are fluidly connected to a conduit 251 which runs through a separating element 241 between the conduits 225A and 225B and fluidly connects to a central feeding channel 253 in the separating element 241. The separating element 241 can be any wall(s), plate(s) or body(ies) used to separate the two flow conduits 225A and 225B in the flow device 205A. The central feeding channel 253 is fluidly connected to the body-forming fluid pump 207 (FIG. 1) which feds the body-forming fluid to the fluid introduction apertures 249 at a desired flow rate.

It is noted that the merge edge 245A is spaced away upstream of the constriction 227 and start of the second flow section 228A, with the merge edge 245A positioned within the third flow section 230A. This creates a separate body-forming fluid introduction zone proximate the merge edge 245A and acceleration zone within the second flow section 228A.

The illustrated flow conduits 225A, 225B and 229A can have any suitable configuration and cross-sectional shape. In some embodiments, the flow conduits 225A, 225B and 229A have a circular, oval, square, rectangular or other regular polygon cross-sectional shape. In some embodiments, the flow conduits 225A, 225B and 229A are formed between two spaced apart plates 208A and 209A having a divider plate 241 located therebetween.

Figure 3:
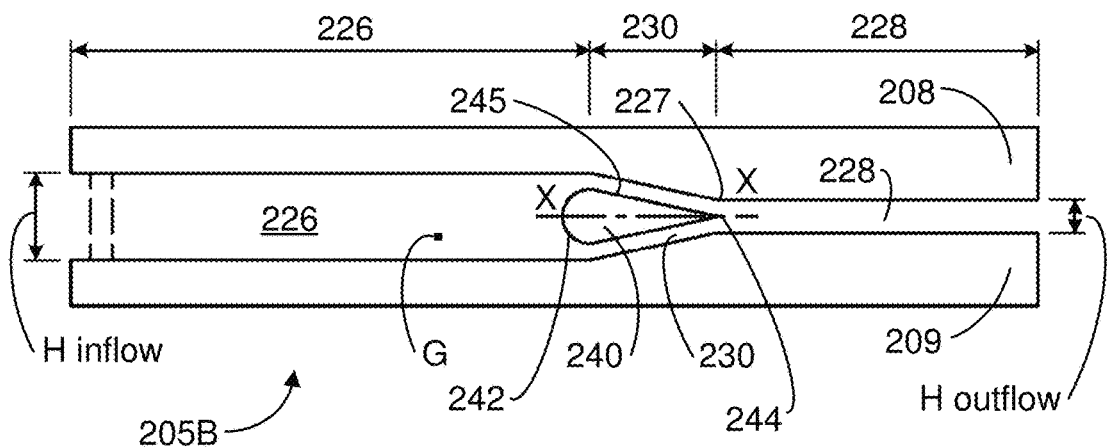
FIG. 3 provides a cross-sectional schematic view of a second embodiment of the flow device for use in the fibre generation device shown in FIG. 1.
Figure 4:
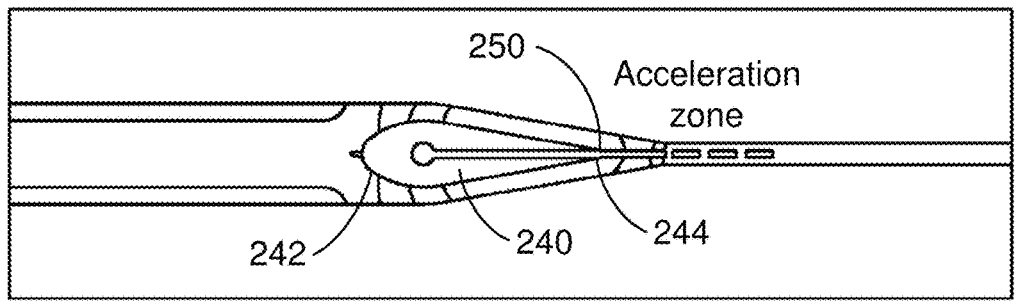
FIG. 4 provides a velocity contour diagram for flow over a hydrofoil of the hydrofoil configuration flow device shown in FIG. 3.
Figure 5:
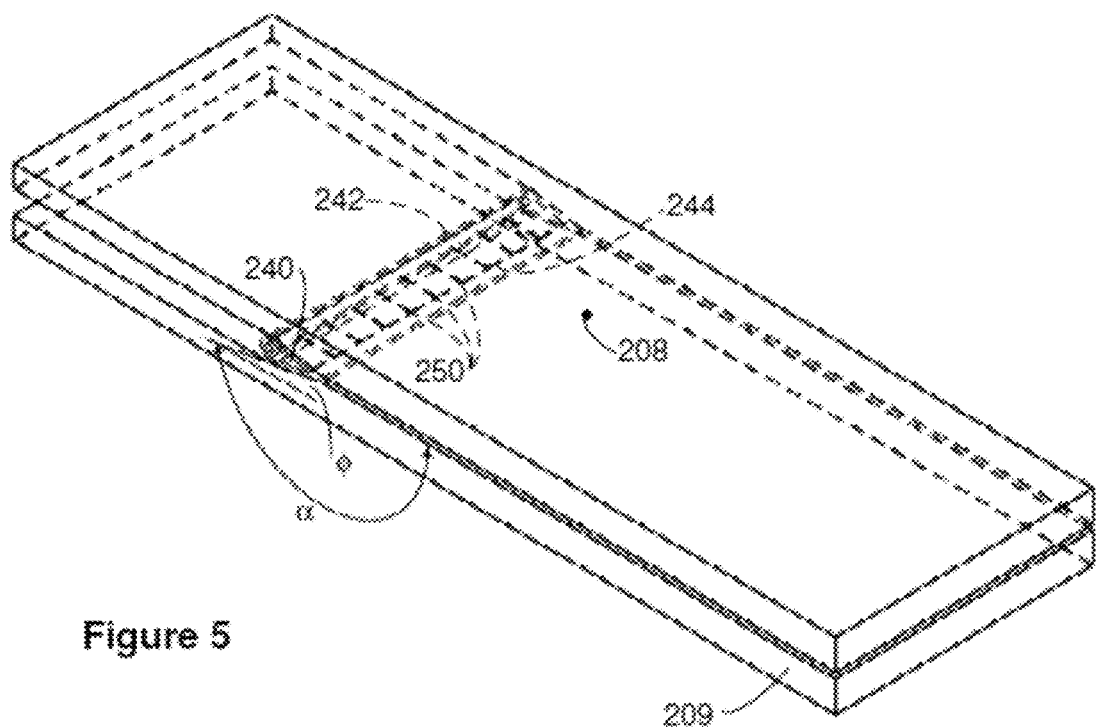
FIG. 5 provides a perspective schematic view of the flow plates of the flow device shown in FIG. 3.
Figure 6A:
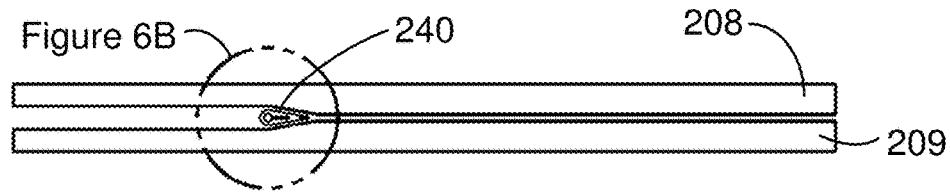
FIG. 6 provides a (A) side view; and (B) detailed view of the generation section of the flow device illustrated in FIG. 3.
Figure 6B:
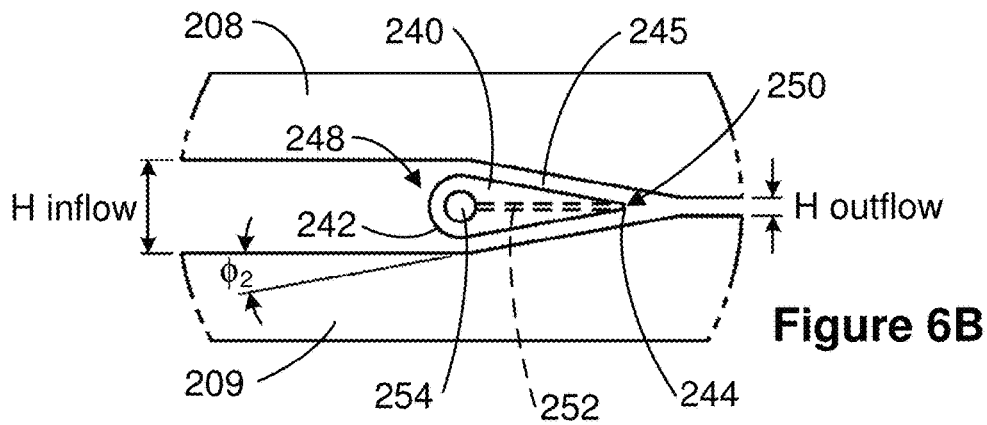

FIGS. 3 to 11 illustrate a second embodiment of the flow device 205B for use in the apparatus 200 shown in FIG. 1. As shown in FIG. 3, this embodiment of the flow device 205B separates a single inflow 225 of dispersion medium into two separate flow paths 225C and 225D using a hydrofoil 240.

Figure 7:
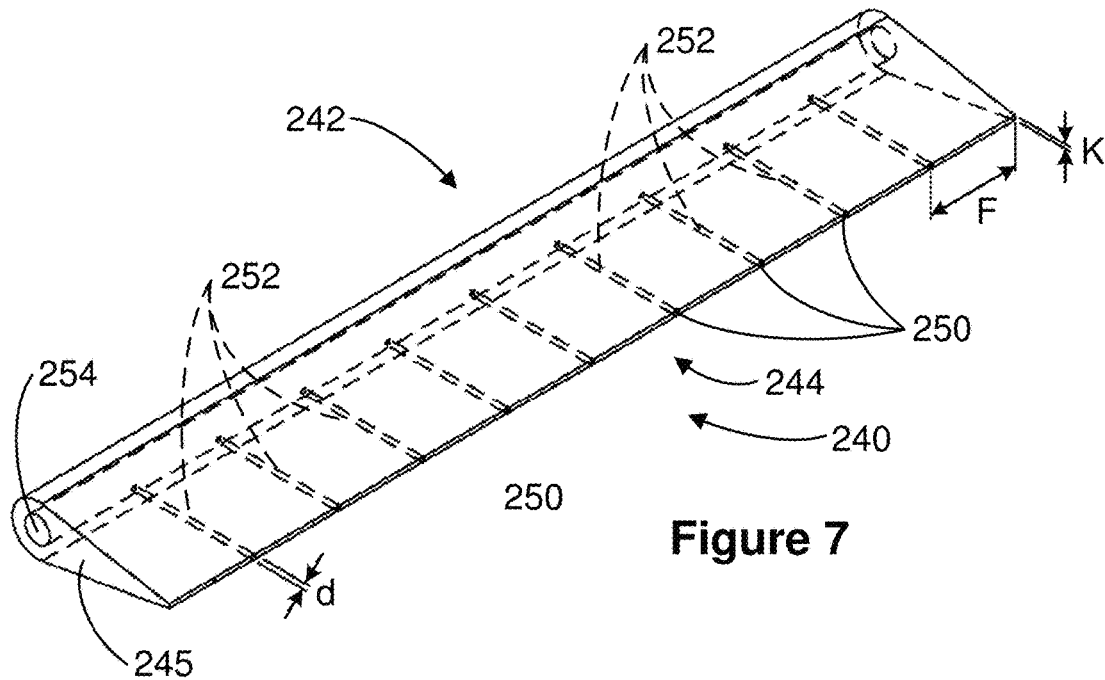
FIG. 7 provides a perspective view of one form of the hydrofoil used in the flow device illustrated in FIG. 3.

As best shown in FIG. 7, the illustrated flow device comprises a fluid tight casing 206 which houses a pair of spaced apart plates, an upper plate 208, and a lower plate 209, between which the dispersion medium flows. The fluid tight casing 204 comprises an elongate tubular body 210 having a rectangular cross-section. The tubular body 210 includes a top 212 and a base 214 which lie substantially parallel with each plate 208. The tubular body 210 includes two flanged ends 215. End plates 216 and 217 are fluidly sealed onto the ends of flanged ends 215 using a series of fasteners 218, in this case bolts and fastening nuts. A fluid seal, such as an O-ring (not illustrated) is sandwiched between the respective end plates 216 and 217 and flanged ends 215. An inlet header 220 and outlet header 222, comprising conical or flared conduits are formed in the end plates 216 and 217, and are used to fluidly connect a flow path between the plates 208 and 209 with the flow circuit 202.

The upper plate 208 is movably attached to the top 212 of the elongate tubular body 210 through a series of adjustable fasteners 216 (two of which are shown in FIG. 7), illustrated as bolts. Similarly, the lower plate 209 is movably attached to the base 214 of the elongate tubular body 210 through a series of adjustable fasteners 217 (two of which are shown in FIG. 7), illustrated as bolts. The distance between the top 212 and the upper plate 208 and the distance between the base 214 and the lower plate 209 can be adjusted by rotating the respective adjustable fasteners 216 and 217, and thereby adjusting the position of the upper plate 208 or lower plate 209 on that fastener. It should be appreciated that other attachment and adjustable arrangements could equally be used, and that these fall into the spirit and scope of the present invention.

The plates 208 and 209 held within the flow device 201 are best illustrated in FIGS. 3 to 7. As shown in those figures, the plates comprise two spaced apart plates forming a gap G between the plates through which the dispersion medium flows. The gap G has three distinct sections:

a first flow section 226, comprising an inflow section having a gap height $H_{inflow}$ (FIG. 3);

a second flow section 228, comprising an outflow section having a gap height $H_{outflow}$ (FIG. 3); and a third flow section 230 located between the first 226 and second flow section 228 of having a transitory cross-sectional area which tapers at about 10° between the first 226 and second flow section 228.

As shown in the figures, $H_{inflow}$ is greater than $H_{outflow}$, making the cross-sectional area of the first flow section 226 greater than the cross-sectional area of the second flow section 228. This dimension change forms a flow constriction 227 in the third flow section 230. The flow constriction preferably comprises a reduction in cross-sectional area between the first flow section and second flow section of at least 50%, more preferably at least 60%, yet more preferably at least 70%, and most preferably at least 75%. In the illustrated embodiment, the gap between plates preferably reduces from $H_{inflow}$ of 9 mm to $H_{outflow}$ of 2 mm. However, it should be appreciated that the exact dimensions would depend on the size and scale of the apparatus 200.

The dimension of the gap between the first flow section ($H_{inflow}$) and the second flow section ($H_{outflow}$) between the plates 208 and 209 can be varied by altering the positioning of the two plates 208, 209 within the casing 204 using the adjustable fasteners 218 as described above.

Hydrofoil 240 (best illustrated in FIGS. 4 and 7) is located between the plates 208, 209 and substantially within the third flow section 230 of the gap G. It is noted that the trailing edge 244 of the hydrofoil 240 is spaced away upstream of the start of the second flow section 228, with the trailing edge 244 positioned within the third flow section 230. This creates a separate body-forming fluid introduction zone proximate the trailing edge 244 of the hydrofoil 240 and acceleration zone within the second flow section 228 of the gap G.

As best shown in FIG. 4, the hydrofoil 240 assists in the acceleration of the dispersion medium proximate and following the trailing edge 244 of the hydrofoil 240 in order to draw and form a fibrous polymer filament from the body-forming fluid introduced from the trailing edge 244 of the hydrofoil 240. The fluid acceleration zone follows the trailing edge 244 of the hydrofoil 240, and is enhanced by the flow constriction 227 in the second flow section 228 and third flow section 230. Again, this fluid acceleration may also create the required tensile stress in the body and/or shear rates in the dispersion medium to fragment the body formed by the body-forming fluid in the dispersion medium.

While not wishing to be bound by any one theory, it is thought that the acceleration zone following the trailing edge 244 of the hydrofoil 240 (created by the hydrofoil and the flow constriction in the second flow section 228 and third flow section 230) accelerates the dispersion medium and formed body through the second flow section 228, inducing the development of an extensional flow field. The body, in the case of the illustrated example in FIG. 4, a fibre, transported by the fluid is stretched in response to the acceleration of the dispersion medium. The velocity difference between the second flow section 228 and third flow section 230 result in a tensile stress within the fibre. Shear stress can also be applied by the flow characteristics of the surrounding dispersion medium. The body, in this case, a fibre, fragments if the maximum stress in and applied to the body exceeds the tensile strength of the fibre.

The illustrated hydrofoil 240 has a linear configuration and is substantially symmetrical about a chord line X-X (FIG. 3) between the leading face 242 and trailing edge 242 of the hydrofoil 244. As is understood in the art, the chord line X-X of a hydrofoil 240 is a straight line connecting the leading edge 248 and trailing edge 244 of the hydrofoil 240. The leading face 242 of the illustrated hydrofoil 240 comprises a rounded or curved surface. Furthermore, the trailing edge 244 of the hydrofoil 240 comprises a substantially flat edge. The hydrofoil 240 also a tapered body 245 which tapers by about 10° (angle ø in FIG. 5, angle α is 160°) between the leading face 242 and trailing edges 244 thereof relative to the cord line X-X, therebetween. Advantageously, this configuration also creates laminar flow at or proximate the trailing edge 244 of the hydrofoil 240.

In some embodiments (not illustrated), the tapered body 245 of the hydrofoil 240 includes at least one curve or wave along the longitudinal length of the tapered body 245. In some embodiments, the tapered body 245 of the hydrofoil 240 includes a plurality of curves or waves along the longitudinal length thereof in order to create a desired flow pattern across the hydrofoil 240.

The hydrofoil 240 is positioned between the plates 208 and 209 with the trailing edge 244 of the hydrofoil 240 proximate the transition from the third flow section 230 to the second flow section 228. The leading face 242 of the hydrofoil 240 is located within an end portion of the first flow section 226, immediately prior to the third flow section 230. As best shown in FIG. 11, the hydrofoil 240 also attached to the casing 210, with the side edges 243 of the hydrofoil being attached to the adjacent side of the casing 210. This connection can be any suitable fastening or connection arrangement including fasteners, rivets, mounting brackets, snap fasteners or the like. The connection preferably allows the hydrofoil 240 to move within the gap G, more preferably pivot about the connection point between the plates 208, 209. This enables the hydrofoil 240 to self-align in the flow of the dispersion medium, thereby ensuring symmetric flow around the hydrofoil 240 and at the fluid introduction apertures 250 (described below).

In use, the pump arrangement 203 pumps the dispersion medium into the inlet header 220 of the flow device 205B, between the plates 208 and 209 and across the hydrofoil 240. The dispersion medium can therefore be pumped over the hydrofoil 240 at a desired flow rate to accelerate the body-forming fluid in order to draw and form a fibrous polymer filament at the trailing edge 244 of the hydrofoil 240.

In this embodiment, the acceleration and constriction of the dispersion medium and body forming fluid therein following the trailing edge 244 of the hydrofoil 240 and within the third flow section 230 creates conditions allowing fragmentation of the formed body. Where the body is a filament, this results in the formation of fibres, typically short fibres. The shearing or fragmentation of the formed body, for example a filament to provide the fibres, may be carried out at a suitable shear stress. In the illustrated embodiment, the configuration of the hydrofoil 240, third flow section 230 and flow velocity of the dispersion medium across the hydrofoil 240 from the leading face 242 to the trailing edge 244 thereof creates a shear in the dispersion medium at the trailing edge of the hydrofoil where the linear fluid speed is at least 0.2 m/s, preferably between 0.2 to 20 m/s, more preferably between 0.3 to 10 m/s. In some embodiments, fragmentation can result through the development of shear stresses in the range of from about 100 to about 190,000 cP/sec.

While one hydrofoil 240 is illustrated, it should be appreciated that multi-hydrofoil systems are also possible and within the scope of the present invention. The multi-hydrofoil systems may have the hydrofoils aligned side by side, stacked, placed in parallel, in series or the like.

As best illustrated in FIG. 7, the hydrofoil 240 includes a plurality of fluid introduction apertures 250 located at or proximate the trailing edge 244 configured to feed the body-forming fluid into the dispersion medium. As discussed above, the hydrofoil 240 is configured to provide laminar flow at its trailing edge 244. The location of the fluid introduction apertures 250 at the trailing edge 244 therefore provides a smooth transition between outer dispersion medium flow and the injected flow of the body-forming fluid. Each fluid introduction aperture 250 is spaced apart by dimension F along the longitudinal length of the hydrofoil 240. Each of the apertures 250 are fluidly connected to a conduit 252 which runs through each hydrofoil 240 and fluidly connects to a central feeding channel 254 in the hydrofoil 240. The central feeding channel 254 runs substantially longitudinally through the length of the hydrofoil 240. That central feeding channel 254 is fluidly connected to the body-forming fluid pump 207 (FIG. 1) which feds the body-forming fluid to the fluid introduction apertures 250 at a desired flow rate.

The use of multiple fluid introduction apertures 250 provides a means to have large fibre production rate.

Again, the body-forming fluid may be injected into the dispersion medium at a rate in a range selected from about 0.0001 L/hr to about 10 L/hr, or from about 0.1 L/hr to 10 L/hr. When the body-forming fluid is a body-forming solution, such as a polymer solution, the body-forming solution may be injected into the dispersion medium at a rate in a range selected from the group consisting of from about 0.0001 L/hr to 10 L/hr, from about 0.001 L/hr to 10 L/hr, or from about 0.1 L/hr to 10 L/hr.

One skilled in the relevant art would understand that the rate at which a body-forming fluid is introduced to the dispersion medium may be varied according to the scale of the flow device 205 and apparatus 200, the volume of body-forming fluid employed, and the desired time for introducing a selected volume of body-forming fluid to the dispersion medium. In some embodiments it may be desirable to introduce the body-forming fluid into the dispersion medium at a faster rate this may assist in the formation of fibres with smoother surface morphologies.

The use of a hydrofoil 240 enables the fluid introduction apertures 250 to have a number of different shapes and configurations, whilst still maintaining control on the flow of the dispersion medium flowing to those fluid introduction apertures 250. Therefore, while not illustrated, it should be appreciated that the fluid introduction apertures 250 could have any number of shapes including star shaped, oval shaped, any number of regular polygons such as triangular, square, rectangular, pentagonal, octagonal or the like.

As illustrated in FIG. 8, the hydrofoil 340 can have a cylindrical or elliptical geometry, with the leading face 342 and trailing edge 344 having an annular configuration, being centred about a hydrofoil center point Y. As shown in FIG. 8(B), this hydrofoil 340 has a toroidal shape, having a taper between the leading face 342 and trailing edge 344. The hydrofoil 340 includes a plurality of fluid introduction apertures 250 circumferentially located and spaced apart around the trailing edge 344. Similar to the hydrofoil 150 shown in FIGS. 6 and 8, each of the fluid introduction apertures 350 are fluidly connected to a conduit 352 which runs through each hydrofoil 340 and fluidly connects to a central feeding channel 354 in the hydrofoil 340. The central feeding channel 354 runs annually around the circumference of the hydrofoil 240. That central feeding channel 354 is fluidly connected to a body-forming fluid feed pump (not illustrated) which feds the body-forming fluid to the fluid introduction apertures 250 at a desired flow rate. The hydrofoil 340 would preferably be suspended in a conduit using one or more supports or braces. While not illustrated, it should be appreciated that the fluid connection to a body-forming fluid feed pump (for example pump 207 shown in FIG. 1) would likely be positioned in one or more of those braces/supports. In use, the dispersion medium would flow through the inner void and outer surfaces of the hydrofoil 340.

While not illustrated, it should be appreciated that the fluid introduction apertures 250 could be fluidly connected to at least two different body-forming fluids. This enables a fibre to be formed including two different materials.

As illustrated in FIG. 9, the fluid introduction apertures 450 in some embodiments of the hydrofoil 440 can be fluidly connected to two conduits or channels 452A and 452B through which the body-forming fluid flows. In the illustrated embodiment, each conduit or channel 452A and 452B is connected to a separate central feeding channel 454A and 454B which feed a selected body-forming fluid to the respective conduits 452A and 452B. The separate conduits 452A and 452B join at a merge section 455 located proximate to the fluid introduction apertures 450. The merge section 455 comprises a Y junction in the illustrated embodiment, but may comprise a T junction or other junction configuration in other embodiments. The merge section 455 also includes a short conduit fluidly connected to the fluid introduction aperture 250. This arrangement provides a means to "pre-mix" different body-forming fluids thanks to laminar-flow channels to obtain multi-domain fibres.

As shown in FIG. 10, the fluid introduction apertures 250 can comprise various shapes and configurations. For example, the fluid introduction apertures 250 could comprise a circular (FIG. 10(a) to (e)), star (FIG. 10(f)), square ((FIGS. 10(g) and (h)), cross (FIG. 10(i)) or rectangular/slot shape (FIG. 10(j)). It should be appreciated that the aperture 250 could comprise a large number of other shapes over and above those illustrated in FIG. 10.

As illustrated in FIGS. 10 (c), (d) and (h), the fluid introduction aperture 250 could comprise two or more proximate and aligned apertures 250, each aperture 250 being fluidly connected to a different body-forming fluid. This enables the respective body-forming fluids to overlap, intertwine or at least interact in some way when introduced into the dispersion medium. Additionally, this allows fibre configurations to be formed with two different materials having an intertwined, mixed or otherwise interconnected fibre configuration. The aperture 250 shown in FIG. 10(c) comprises two side by side fluid introduction apertures 250X and 250Y formed in a circular aperture. Each of the fluid introduction apertures 250X and 250Y would be fluidly connected to a separate body-forming fluid feeding arrangement (conduit 252 and central feeding channel 254). Similarly, the aperture 250 shown in FIGS. 10(d) and (e) comprises four side by side fluid introduction apertures 250E, 250F, 250J and 250K formed in a circular or square aperture. Again, each of the fluid introduction apertures 250E, 250F, 250J and 250K would be fluidly connected to a separate body-forming fluid feeding arrangement (conduit 252 and central feeding channel 254).

As shown in FIGS. 10(b) and (e), the fluid introduction apertures 250 comprise two or more concentrically arranged or overlapping apertures. This can produce a fibre within fibre configuration, where a first fibre is encapsulated or otherwise formed within another fibre. A first material can be encapsulated within a second material in those embodiments in which the at least two of the at least two apertures are fluidly connected to different body-forming fluids. The aperture 250 shown in FIG. 10(b) comprises two concentrically arranged circular fluid introduction apertures 250M and 250N. Similarly, the aperture 250 shown in FIG. 10(e) comprises two overlapping arranged circular fluid introduction apertures 250M and 250N. The inner fluid introduction aperture 250N is formed within outer fluid introduction aperture 250M, and is positioned off-centre with respect to outer fluid introduction aperture 250M. Each of the fluid introduction apertures 250M and 250N would be fluidly connected to a separate body-forming fluid feeding arrangement (conduit 252 and central feeding channel 254).

The fluid flow in the first flow section 226 of the conduit can have any suitable flow characteristic, including laminar, turbulent or the like. In preferred embodiments, the fluid flow arrangement forms a laminar flow in the first flow section 226. In order to assist in laminar flow, a number of diffuser baffles 276 are located at the start of the first flow section 226 which, in use, contacts the dispersion medium flow upstream of the hydrofoil 240.

Figure 12:
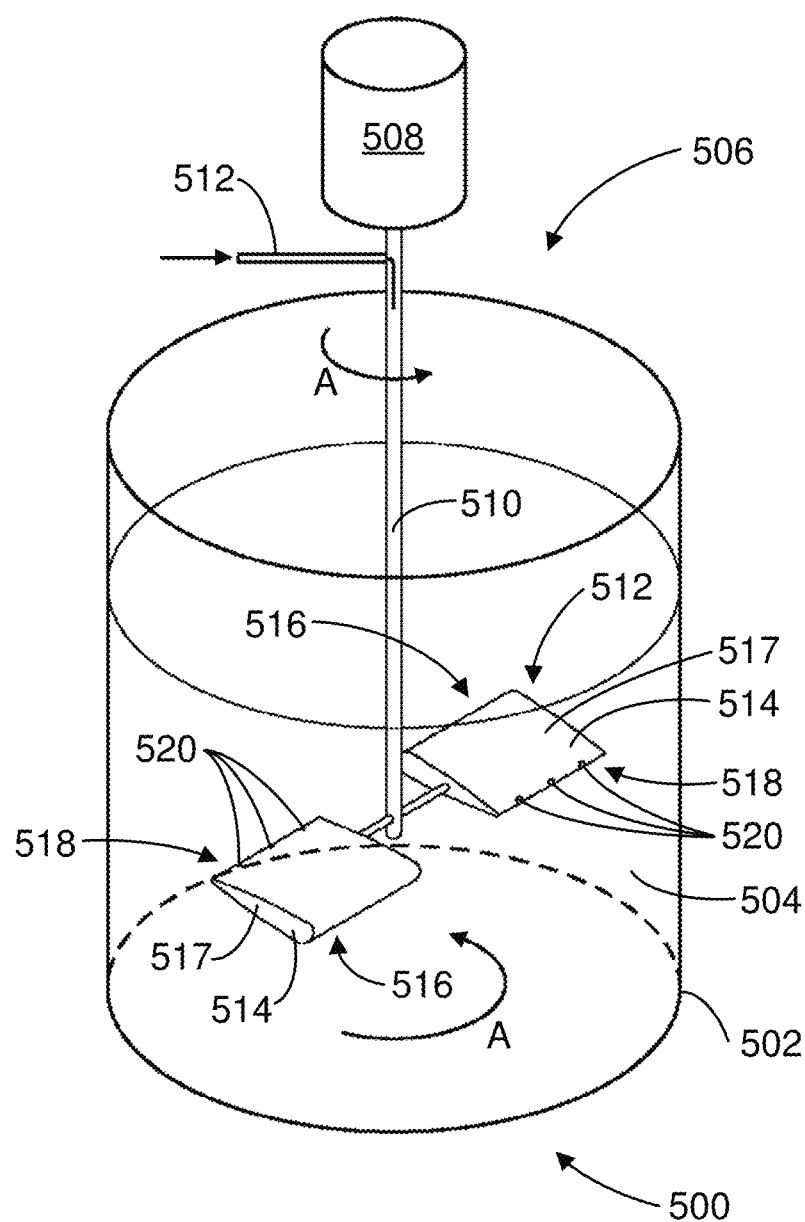
FIG. 12 provides a perspective view of a second embodiment of a fibre generation device according to the present invention.

Referring now to FIG. 12, there is shown a second apparatus 500 for producing bodies such as fibres and/or short nanofibres. The illustrated apparatus 500 includes a fluid container 502 forming a fluid housing configured to house a dispersion medium 504; a stirrer or mixer arrangement 506, which includes a drive element 508, in this case a motor, connected to a shaft 510 having an impeller arrangement 512 immersed in the dispersion medium 504. The impeller arrangement 512 includes two hydrofoils 514 arranged 180° apart about the impeller. Each hydrofoil 514 has a leading face 516 and trailing edge 518. The hydrofoils 514 are rotatably driven in the dispersion medium 504 in the direction of the arrows A by the drive element 508 to cause the dispersion medium 504 to flow across each hydrofoil 514 from the leading face 516 to the trailing edge 518 thereof.

Each hydrofoil 514 includes a plurality of fluid introduction apertures 520 located at or proximate the trailing edge configured to feed the body-forming fluid into the dispersion medium. Each of the apertures 520 are fluidly connected to a conduit which runs through each hydrofoil 514 and through the shaft 510 to a connection conduit 522. The connection conduit 522 is fluidly connected to a pump (not illustrated) such as a peristaltic pump, syringe pump of the like, which feds the body-forming fluid to the fluid introduction apertures 520 at a desired flow rate.

The body-forming fluid may be injected into the dispersion medium at a rate in a range selected from about 0.0001 L/hr to about 10 L/hr, or from about 0.1 L/hr to 10 L/hr. When the body-forming fluid is a body-forming solution, such as a polymer solution, the body-forming solution may be injected into the dispersion medium at a rate in a range selected from the group consisting of from about 0.0001 L/hr to 10 L/hr, from about 0.001 L/hr to 10 L/hr, or from about 0.1 L/hr to 10 L/hr.

Again, a person skilled in the relevant art would understand that the rate at which a body-forming fluid is introduced to the dispersion medium may be varied according to the scale of the apparatus 500, the volume of body-forming fluid employed, and the desired time for introducing a selected volume of body-forming fluid to the dispersion medium. In some embodiments it may be desirable to introduce the body-forming fluid into the dispersion medium at a faster rate this may assist in the formation of fibres with smoother surface morphologies.

The fluid container 502 can comprise any suitable receptacle, container, vessel or other bulk liquid retaining body which can house the dispersion medium 504. The exact container would depend on the scale of the apparatus. For bench scale production, a beaker or other bench top container could be used. For larger scale production, it is envisaged that a large mixer process vessel or the like would be suitable.

The configuration of the hydrofoils 514 creates the necessary acceleration of the body-forming fluid in order to draw and form a desired body such as a particle or fibrous polymer filament from the body-forming fluid introduced at the trailing edge 518 of the hydrofoil 514. Again, the flow pattern and fluid acceleration may also cause fluid constriction in the dispersion medium proximate and/or following the trailing edge 518 of the hydrofoil 514. In some cases, the acceleration created can produce the required tensile stress and/or shear rates to fragment that body formed by the body-forming fluid in the dispersion medium. In the case of formed filaments, that fragmentation can form short fibres.

The illustrated hydrofoil 514 can have a similar configuration to the hydrofoil 240 described in relation to the flow device 205B of the previous embodiment.

As previously described, a large number of body-forming fluids and dispersion mediums can be used in the apparatus of the present invention. Suitable examples of each of the body-forming fluid (described as a fibre-forming liquid) and the dispersion medium are described in detail in International application PCT/AU2012/001273, the contents of which are incorporated into this specification by this reference.

EXAMPLES

Example 1—Shear Predictions

In order to determine whether the flow device illustrated in FIGS. 3 to 11 can generate the required shear forces under laminar flow, the calculations shown in this document have been performed. All calculations are made with reference to the website http://www.pressure-drop.com/Online-Calculator/index.html and the following list of values:
  Density of Butanol: 805.7 kg m$^{-3}$
  Viscosity of Butanol: 2.593 10$^{-3}$ kg m$^{-1}$ s$^{-1}$
  Absolute pipe roughness 0.01 mm
  Pipe width: 10 cm
Volume and Velocity/Shear Calculations The following pressures per meter of pipe at different velocities and pipe outflow heights ($H_{outflow}$) have been calculated for a rectangular cross-section test pipe having a 10 cm width and the height specified in each of the tables.

TABLE 1

1 mm height

| Velocity (m/s) | Pressure (kPa) | Volume/s | Flow type* |
|---|---|---|---|
| 0.1 | 3 | 0.01 | L |
| 0.2 | 6 | 0.02 | L |
| 0.4 | 13 | 0.04 | L |
| 0.8 | 25 | 0.08 | L |
| 1.6 | 50 | 0.16 | L |
| 3.2 | 100 | 0.32 | L |
| 6.4 | 374 | 0.64 | T |
| 12.8 | 1305 | 1.28 | T |

TABLE 2

2 mm height

| Velocity (m/s) | Pressure (kPa) | Volume/s | Flow type* |
|---|---|---|---|
| 0.1 | 1 | 0.02 | L |
| 0.2 | 2 | 0.04 | L |
| 0.4 | 3.5 | 0.08 | L |
| 0.8 | 7 | 0.16 | L |
| 1.6 | 13 | 0.32 | L |
| 3.2 | 45 | 0.64 | T |
| 6.4 | 153 | 1.28 | T |
| 12.8 | 537 | 2.56 | T |

TABLE 3

3 mm height

| Velocity (m/s) | Pressure (kPa) | Volume/s | Flow type* |
|---|---|---|---|
| 0.1 | 0.3 | 0.03 | L |
| 0.2 | 0.7 | 0.06 | L |
| 0.4 | 1.4 | 0.12 | L |
| 0.8 | 2.8 | 0.24 | L |
| 1.6 | 8 | 0.48 | T |
| 3.2 | 27 | 0.96 | T |
| 6.4 | 92 | 1.92 | T |
| 12.8 | 324 | 3.84 | T |

TABLE 4

6 mm height

| Velocity (m/s) | Pressure (kPa) | Volume/s | Flow type* |
|---|---|---|---|
| 0.1 | 0.09 | 0.06 | L |
| 0.2 | 0.18 | 0.12 | L |
| 0.4 | 0.36 | 0.24 | L |
| 0.8 | 1.29 | 0.48 | T |
| 1.6 | 3.4 | 0.96 | T |
| 3.2 | 11.4 | 1.92 | T |
| 6.4 | 38.5 | 3.84 | T |
| 12.8 | 140 | 7.68 | T |

*Flow type is either L = Laminar or T = Turbulent.

The results indicate that laminar flow is possible in each of the specified conditions for each of the inflow and outflow conduits. It is noted that the inflow conduit (the first section 226 in FIG. 3) will have the same volume moving through it as the outflow conduit (the second section 228 in FIG. 3) and so will have a lesser pressure, lower speed and similar flow type to the outflow (still proportional to the above values) for the size of conduit selected for the outflow conduit.

Example 2—Apparatus Fibre Generation

The flow device 205B illustrated in FIG. 11 and generally illustrated in FIG. 1 was utilised to generate nanofibres.

Figure 13:
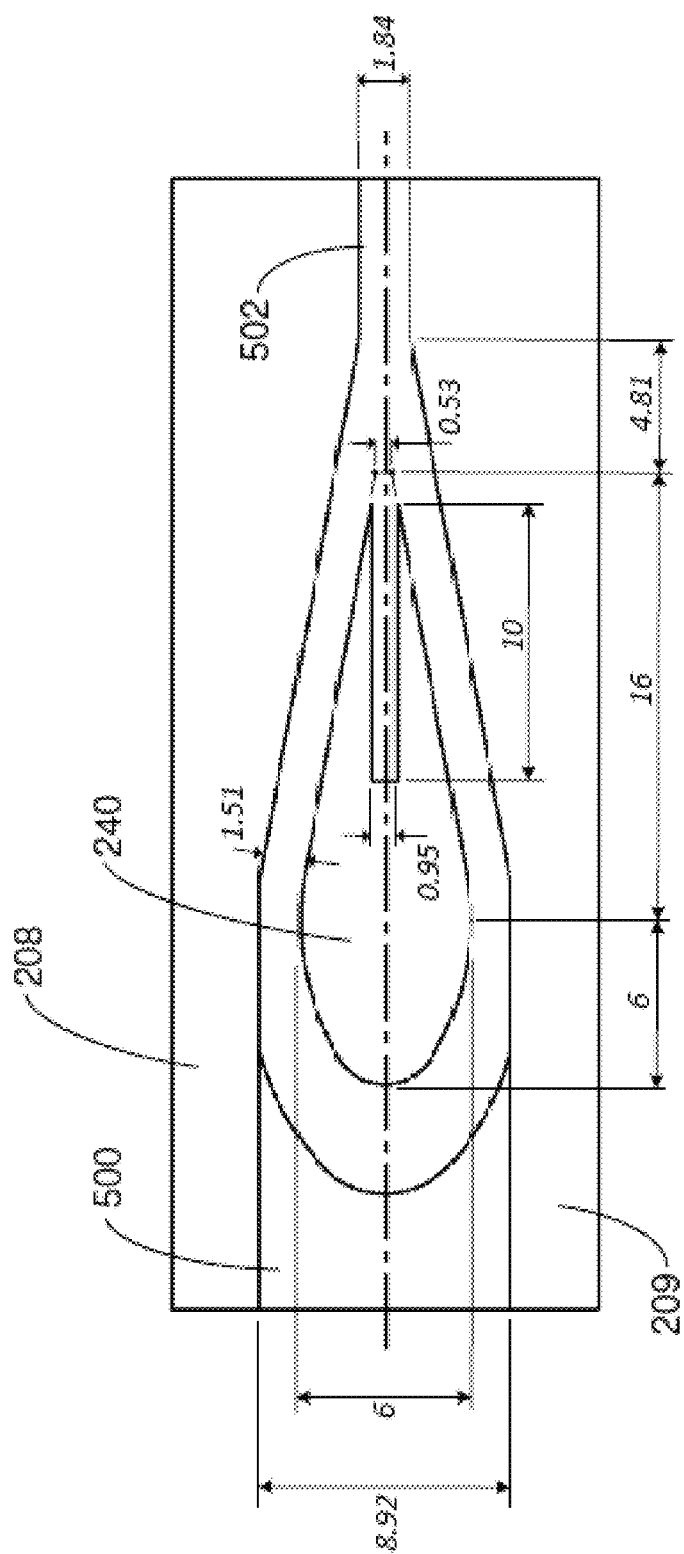
FIG. 13 provides the configuration and dimensions of the hydrofoil and channel used in an experimental apparatus according to the present invention.

The dimensions (in mm) of the flow channel and hydrofoil 240 are shown in FIG. 13. As shown in FIG. 13, the inlet channel section 500 has a height and depth of 8.92 mm×3 mm depth, and the outlet channel section 502 as a height and depth of 1.84 mm×3 mm. The depth of the channel throughout the device was 3 mm. As shown in FIG. 1, a pump 203 (KDS Legato-270 syringe pump) was used to pump a butanol dispersion medium held at ~15° C. into the inlet header 220 of the flow device 205B, between the plates 208 and 209 and across the hydrofoil 240. The butanol dispersion medium was pumped over the hydrofoil 240 at various flow rates as detailed in table 5. A Poly(ethylene acrylic acid) (PEAA) body-forming fluid held at ~22° C. was pumped into the central feeding channel 254 in the hydrofoil 240 at various flow rates using a syringe pump 207 (New Era NE-4000), again as detailed in table 5 with the body-forming fluid flowing between the plates 208 and 209. The concentration of the Poly(ethylene acrylic acid) (PEAA) used was also varied as detailed in table 5.

TABLE 5

Experimental Conditions and results

Figure 14:
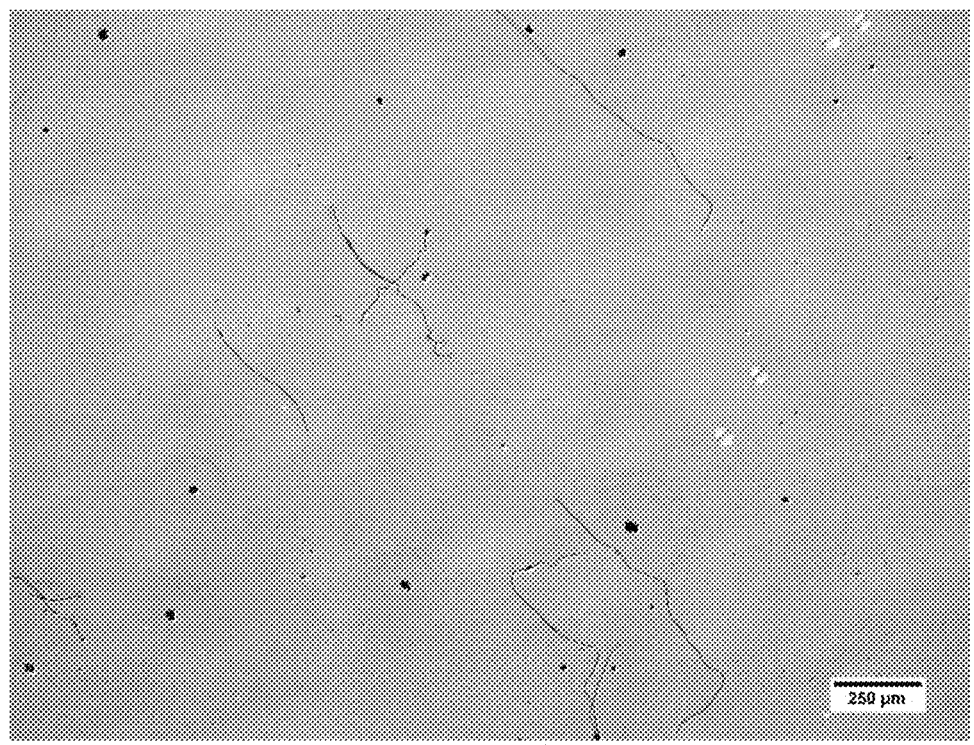
FIGS. 14 to 19 provide optical microscope images of fibres produced from the experimental apparatus of FIG. 13.
Figure 15:
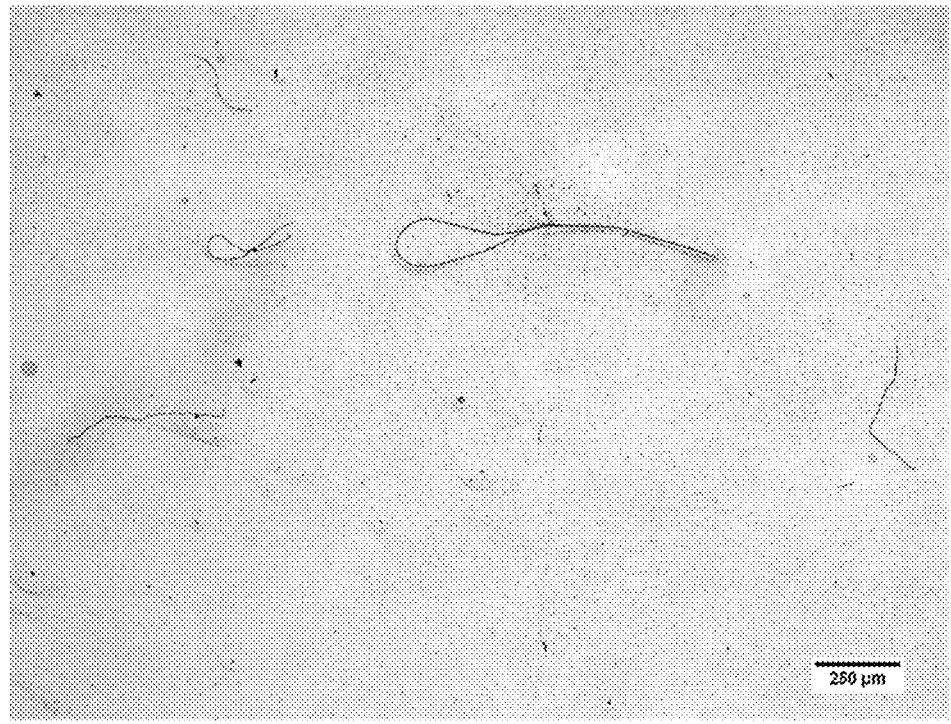
Figure 16:
Figure 17:
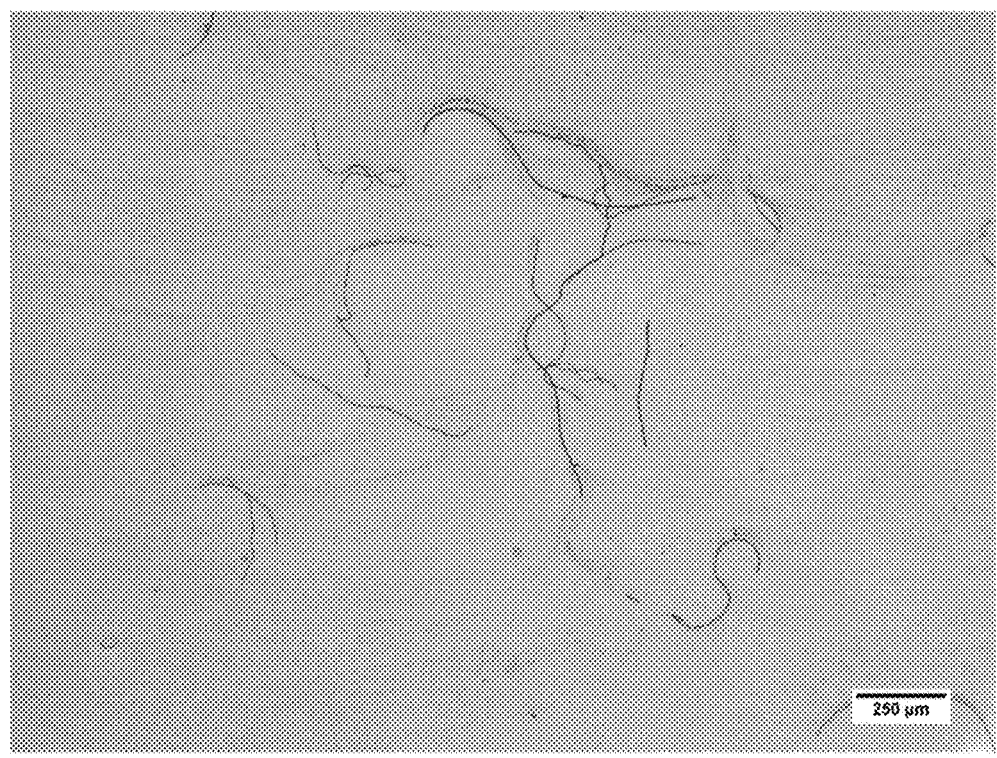
Figure 18:
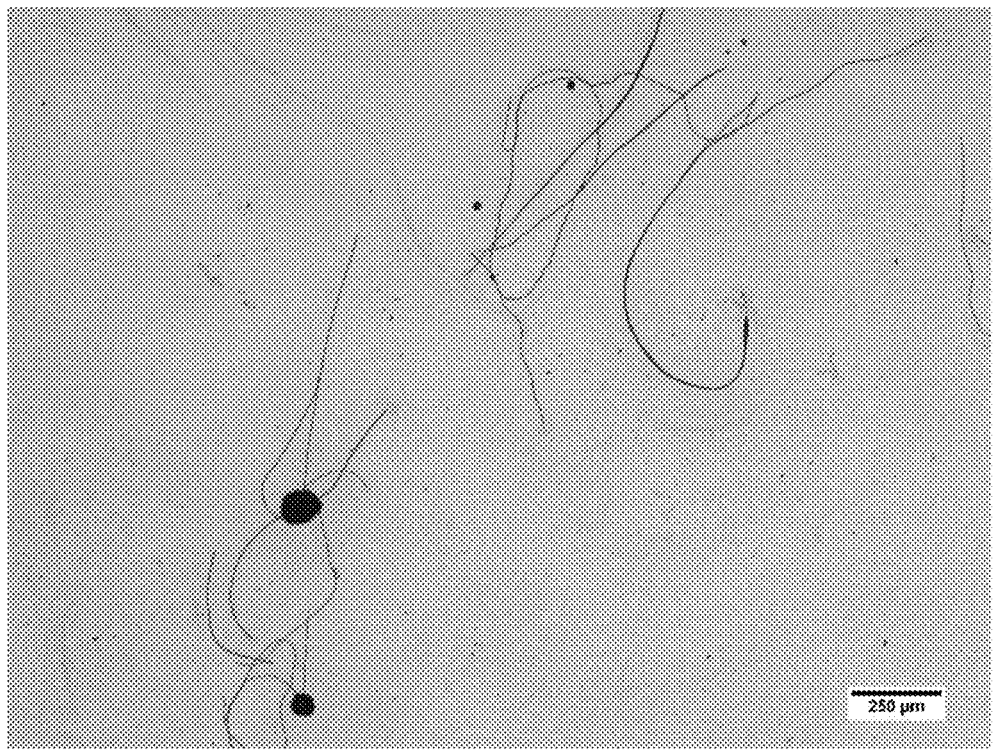
Figure 19:
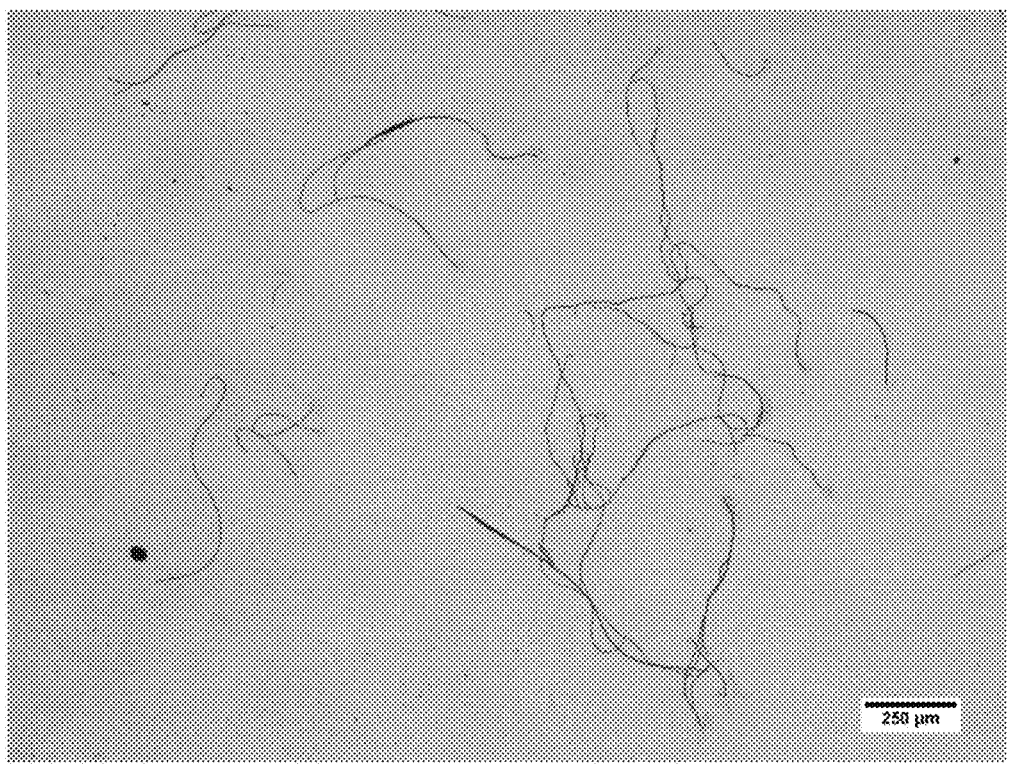

| Dispersion Medium Flow rate (Butanol @ ~15° C.) | Body Forming Fluid Flow rate (PEAA dispersion @ ~22° C.) | PEAA concentration wt/(vol-of-solvent) | Fibre Diameter (nm) | Fibre Image |
|---|---|---|---|---|
| 60 mL/min | 7.8 mL/hr | 16% | 800-1300 | FIG. 13 |
| 100 mL/min | 1.6 mL/hr | 16% | 500-1500 | FIG. 14 |
| 60 mL/min | 7.8 mL/hr | 12% | 400-2100 | FIG. 15 |
| 200 mL/min | 23.5 mL/hr | 12% | 900-3000 | FIG. 16 |
| 200 mL/min | 15.7 mL/hr | 12% | 700-2100 | FIG. 17 |
| 240 mL/min | 15.7 mL/hr | 12% | 750-1600 | FIG. 18 |

Fibres formed in each run were captured from the flow using a 20 mL vial placed at the outlet of the device. The resulting fibres were then dried on a microscope slide, studied and photographed using an optical microscope (Olympus DP71). The average diameter of the produced fibres were then determined from these images, the results of which are provided in Table 5. The optical Images of the fibres produced from each run are shown in shown in FIGS. 13 to 18, and correspond to the various runs as detailed in Table 5.

The results clearly illustrate that the flow device shown in FIG. 11 produces short fibres with diameters in the submicron range over a range of dispersion medium and body forming fluid flow conditions.

Those skilled in the art will appreciate that the invention described herein is susceptible to variations and modifications other than those specifically described. It is understood that the invention includes all such variations and modifications which fall within the spirit and scope of the present invention.

Where the terms "comprise", "comprises", "comprised" or "comprising" are used in this specification (including the claims) they are to be interpreted as specifying the presence of the stated features, integers, steps or components, but not precluding the presence of one or more other feature, integer, step, component or group thereof.

The invention claimed is:

1. A short nanofiber production apparatus, the apparatus including:
   a fluid housing configured to house a liquid dispersion medium;
   at least one hydrofoil located in the fluid housing, the hydrofoil having a leading face and a trailing edge, each hydrofoil having a tapered body having a leading face and trailing edges, the tapered body tapering in thickness between 5 and 30 degrees between the leading face and the trailing edges thereof relative to a chord line therebetween;
   at least one fluid introduction arrangement located at or proximate the trailing edge of at least one of the hydrofoils configured to feed a body-forming fluid into the dispersion medium housed in the fluid housing, the fluid introduction arrangement comprising an aperture configured to dispense the body-forming fluid into the liquid dispersion medium;
   an outflow conduit; and
   a fluid flow arrangement configured to flow the liquid dispersion medium across the hydrofoil in a laminar flow from the leading face to the trailing edge thereof to the outflow conduit.

2. An apparatus according to claim 1, further comprising a reduction in the overall fluid flow cross-sectional area from the flow upstream of the fluid introduction arrangement compared to the flow downstream of the fluid introduction arrangement.

3. An apparatus according to claim 2, wherein the fluid housing includes at least a first flow section having a first fluid flow cross-sectional area and at least a second flow section having a second fluid flow cross-sectional area, the first fluid flow cross-sectional area being greater than the second fluid flow cross-sectional area.

4. An apparatus according to claim 3, wherein the flow constriction comprises a reduction in fluid flow cross-sectional area between the first flow section and second flow section of at least 50%.

5. An apparatus according to claim 3, wherein the flow-merge location is spaced away upstream of the start of the second flow section.

6. An apparatus according to claim 3, further including a third flow section located between the first flow section and the second flow sections of the fluid housing, the third flow section having a transitory cross-sectional area interconnecting the first and second flow sections.

7. An apparatus according to claim 6, wherein the transition in the cross-sectional area of the third flow section comprises between 5° and 30° taper between the first and second flow section.

8. An apparatus according to claim 1, wherein the fluid introduction arrangement includes at least one aperture.

9. An apparatus according to claim 8, in which the flow-merge location includes a flow-merge edge proximate the location where the at least two separate flows intersect and merge, the at least one aperture being located at the flow-merge edge.

10. An apparatus according to claim 8, wherein the at least one aperture is fluidly connected to at least two different body-forming fluids.

11. An apparatus according to claim 8, wherein the at least one aperture is fluidly connected to at least two conduits or channels through which at least one body-forming fluid flows, each conduit or channel joining at a merge section located proximate to the at least one aperture.

12. An apparatus according to claim 11, wherein the merge section comprises a Y or T junction.

13. An apparatus according claim 8, wherein the fluid introduction arrangement comprises at least two proximate apertures, each aperture being fluidly connected to the body-forming fluid.

14. An apparatus according to claim 13, wherein at least two of the apertures are fluidly connected to different body-forming fluids.

15. An apparatus according to claim 13, wherein at least two of the apertures are arranged with a first aperture enclosed within a second aperture.

16. An apparatus according to claim 1, comprising a plurality of fluid introduction arrangements spaced apart along the flow-merge location.

17. An apparatus according to claim 1, wherein the tapered body of the hydrofoil comprises a about a 10° taper between the leading face and trailing edges thereof relative to a cord line therebetween.

18. An apparatus according to claim 1, wherein the tapered body of the hydrofoil includes at least one curve or wave along the longitudinal length of the tapered body of the hydrofoil.

19. An apparatus according to claim 1, comprising a plurality of hydrofoils spaced apart within the fluid housing, each hydrofoil including at least one fluid introduction element located at or proximate the trailing edge of at least one of each respective hydrofoil.

20. An apparatus according to claim 1, further including at least one baffle located in a location in the fluid housing configured to contact the dispersion medium flow before the flow-merge location, wherein the baffles are located in the fluid housing upstream of the flow-merge location.

21. An apparatus according to claim 1, wherein the fluid housing comprises a conduit through which the dispersion medium flows, and the conduit includes at least two spaced apart plates.

22. An apparatus according to claim 21, wherein the plates are configured to enable the distance between the plates to be varied.

* * * * *